US012604100B2

(12) United States Patent
Zhang et al.

(10) Patent No.: US 12,604,100 B2
(45) Date of Patent: Apr. 14, 2026

(54) IMAGE PROCESSING METHOD AND ELECTRONIC DEVICE

(71) Applicant: Honor Device Co., Ltd., Shenzhen (CN)

(72) Inventors: Wenhong Zhang, Shenzhen (CN); Tao Shao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/839,960

(22) PCT Filed: Dec. 28, 2022

(86) PCT No.: PCT/CN2022/142762
§ 371 (c)(1),
(2) Date: Aug. 20, 2024

(87) PCT Pub. No.: WO2023/160220
PCT Pub. Date: Aug. 31, 2023

(65) Prior Publication Data
US 2025/0184616 A1      Jun. 5, 2025

(30) Foreign Application Priority Data

Feb. 28, 2022    (CN) .......................... 202210191283.7

(51) Int. Cl.
H04N 23/741 (2023.01)
H04N 23/667 (2023.01)
(Continued)

(52) U.S. Cl.
CPC ......... H04N 23/741 (2023.01); H04N 23/667 (2023.01); H04N 23/69 (2023.01);
(Continued)

(58) Field of Classification Search
CPC .... H04N 23/741; H04N 23/667; H04N 23/69; H04N 23/73; H04N 23/76; H04N 23/81;
(Continued)

(56) References Cited

U.S. PATENT DOCUMENTS 10,027,965 B2    7/2018  Mertens
11,025,830 B1    6/2021  Haynold
(Continued)

FOREIGN PATENT DOCUMENTS

CN         104471939 A      3/2015
CN         107205120 A      9/2017
(Continued)

OTHER PUBLICATIONS

Li et al., "Non-uniform Lightness Image Repeated Exposure Directed by Visual Mechanism," Acta Automatica Sinica, vol. 39, No. 9, 9 pages (Sep. 2013).

*Primary Examiner* — Yogesh K Aggarwal
(74) *Attorney, Agent, or Firm* — Leydig, Voit & Mayer, Ltd.

(57) ABSTRACT

An image processing method and an electronic device are provided, applied to the field of image processing technologies. The method is applied to an electronic device. The electronic device includes a camera. The method includes: turning on the camera; obtaining a zoom ratio and a dynamic range of a current shooting scene; determining an image output manner of the camera based on the zoom ratio and the dynamic range; performing, by the camera, image output in a first mode when the zoom ratio is greater than or equal to a first ratio and less than a second ratio and the dynamic range meets a first dynamic range (DR) constraint condition; and performing image processing based on image data outputted by the camera. Image quality in a high dynamic shooting scene can be improved, and a ghosting problem can (Continued)

be avoided, so that shooting experience of a user is improved.

20 Claims, 13 Drawing Sheets

(51) Int. Cl.

| | |
|---|---|
| *H04N 23/69* | (2023.01) |
| *H04N 23/73* | (2023.01) |
| *H04N 23/76* | (2023.01) |
| *H04N 23/81* | (2023.01) |

(52) U.S. Cl.
CPC ............. *H04N 23/73* (2023.01); *H04N 23/76* (2023.01); *H04N 23/81* (2023.01)

(58) Field of Classification Search
CPC .. H04N 5/2628; H04N 23/631; H04N 23/632; H04N 23/633; H04N 23/67; H04N 23/80; H04N 25/42; H04N 23/815; H04N 25/443; H04N 25/46; H04N 25/59; H04N 23/84; G06T 5/00
See application file for complete search history.

(56) References Cited

U.S. PATENT DOCUMENTS

| | | | |
|---|---|---|---|
| 11,044,410 | B2 | 6/2021 | Huang |
| 11,288,782 | B2 | 3/2022 | Lee et al. |
| 11,343,459 | B2 | 5/2022 | Jung et al. |
| 11,412,191 | B2 | 8/2022 | Yadav et al. |
| 11,700,452 | B2 | 7/2023 | Xu et al. |
| 11,838,657 | B2 | 12/2023 | Jeong et al. |
| 2009/0231449 | A1 | 9/2009 | Tzur et al. |
| 2013/0329090 | A1* | 12/2013 | Ise ......................... H04N 23/69 |
| | | | 348/240.99 |
| 2021/0067749 | A1* | 3/2021 | Yadav .................. H04N 23/843 |
| 2021/0090222 | A1 | 3/2021 | Lee et al. |

FOREIGN PATENT DOCUMENTS

| | | | |
|---|---|---|---|
| CN | 107231530 | A | 10/2017 |
| CN | 109005364 | A | 12/2018 |
| CN | 109035181 | A | 12/2018 |
| CN | 110418081 | A | 11/2019 |
| CN | 110445989 | A | 11/2019 |
| CN | 111418201 | A | 7/2020 |
| CN | 112422805 | A | 2/2021 |
| CN | 112543291 | A | 3/2021 |
| CN | 112991245 | A | 6/2021 |
| CN | 113709354 | A | 11/2021 |
| CN | 113727016 | A | 11/2021 |
| CN | 113810590 | A | 12/2021 |
| CN | 113824873 | A | 12/2021 |
| CN | 113824908 | A | 12/2021 |
| CN | 114079762 | A | 2/2022 |
| WO | 2021040284 | A1 | 3/2021 |
| WO | 2021052292 | A1 | 3/2021 |

* cited by examiner

A zoom ratio is greater than or equal to a first ratio (for example, 1x) and less than a second ratio (1)

A zoom ratio is greater than or equal to a second ratio (for example, 2x)

(2)

IMAGE PROCESSING METHOD AND ELECTRONIC DEVICE

CROSS-REFERENCE TO RELATED APPLICATIONS

This application is a national stage of International Application No. PCT/CN2022/142762, filed on Dec. 28, 2022, which claims priority to Chinese Patent Application No. 202210191283.7, filed on Feb. 28, 2022. The disclosures of both of the aforementioned applications are hereby incorporated by reference in their entireties.

TECHNICAL FIELD

This application relates to the field of image processing technologies, and specifically, to an image processing method and an electronic device.

BACKGROUND

With ongoing development of intelligent terminals, shooting is an essential function of the intelligent terminals. Users' needs and experience for shooting (photographing and video recording) of the intelligent terminals are continuously increasing. The intelligent terminals may shoot images in a digital zoom manner. Digital zoom is cropping and/or zooming an image using a software algorithm.

At present, in a shooting scene in a high dynamic range, a multi-exposure fusion technology is usually used for shooting, and a ghosting problem occurs very easily, resulting in poor image quality, and affecting shooting experience of a user.

SUMMARY

In view of this, this application provides an image processing method, an electronic device, a computer-readable storage medium, and a computer program product, which can improve image quality in a high dynamic shooting scene, and can avoid a ghosting problem, so that shooting experience of a user is improved.

According to a first aspect, an image processing method is provided. The method is applied to an electronic device, the electronic device includes a camera, and the method includes:

turning on the camera;

obtaining a zoom ratio and a dynamic range of a current shooting scene;

determining an image output manner of the camera based on the zoom ratio and the dynamic range;

performing, by the camera, image output in a first mode when the zoom ratio is greater than or equal to a first ratio and less than a second ratio and the dynamic range (which may be specifically a dynamic range value) meets a first dynamic range DR constraint condition; and performing image processing based on image data outputted by the camera.

The first mode is a dual conversion gain DCG mode. In the DCG mode, an image outputted by the camera is an image frame obtained by fusing a long exposure frame and a short exposure frame. After the fusion of the two, there is no longer a ghosting problem, and the dynamic range is improved.

The dynamic range that satisfies the first dynamic range DR constraint condition is defined as a high dynamic range.

The dynamic range that does not satisfy the first dynamic range DR constraint condition is defined as a low dynamic range.

Optionally, the first DR constraint condition may be determined based on a histogram of a RAW image of a shooting scene. The first DR constraint condition is determined based on a first proportion, a second proportion, and a third proportion. The first proportion is a proportion of pixels with a pixel value greater than a first pixel value in an image pixel distribution, and the second proportion is a proportion of pixels with a pixel value less than a second pixel value in the image pixel distribution. When both the first proportion and the second proportion are greater than the third proportion, it is considered that the first DR constraint condition is met, and in this case, the dynamic range is defined as the low dynamic range. When both the first proportion and the second proportion are not greater than the third proportion (in other words, at least one of the first proportion and the second proportion is not greater than the third proportion), it is considered that the first DR constraint condition is not met, and in this case, the dynamic range is defined as the low dynamic range.

In addition, a factor of an environmental illuminance may be further considered in determining the image output manner of the camera. Optionally, the method further includes: obtaining an environmental illuminance of the shooting scene; and determining the image output manner of the camera based on the zoom ratio, the dynamic range, and the environmental illuminance.

Optionally, when the zoom ratio is greater than or equal to the first ratio and less than the second ratio and the dynamic range meets the first dynamic range DR constraint condition, regardless of whether the environmental illuminance is a high illuminance or a low illuminance, the camera performs image output in the first mode.

In a possible implementation, when the zoom ratio is greater than or equal to the first ratio and less than the second ratio and a value of the dynamic range does not meet the first DR constraint condition, the camera performs image output in a second mode. The second mode is a binning mode. When the dynamic range is the low dynamic range, the binning mode is used.

Optionally, when the zoom ratio is greater than or equal to the first ratio and less than the second ratio and the value of the dynamic range does not meet the first DR constraint condition, regardless of whether the environmental illuminance is a high illuminance or a low illuminance, the camera performs image output in the second mode.

In the foregoing implementation, when the zoom ratio is equal to the first ratio (for example, 1×), regardless of which image output manner is used by a sensor, post-path processing remains the same. Processing procedures of a preview stream, a shooting stream, and a thumbnail stream are separately described below.

In a possible implementation, in a case that the camera performs image output in the first mode when the zoom ratio is equal to the first ratio and the value of the dynamic range meets the first DR constraint condition or in a case that the camera performs image output in the second mode when the zoom ratio is equal to the first ratio and the value of the dynamic range does not meet the first DR constraint condition, the camera outputs first image data, where a first image format is used for the first image data;

the first image data is stored in a first buffer, and the method further includes:

receiving a first operation of a user, where the first operation is used for triggering shooting; and the performing image processing based on image data outputted by the camera includes:

obtaining the first image data from the first buffer in response to the first operation;

performing image processing on the first image data by using a postprocessing algorithm module or an image signal processor ISP second module to obtain second image data; and performing RGB processing or YUV processing on the second image data by using an ISP third module to obtain data in a YUV format, to output a shot image.

Therefore, in a case that the zoom ratio is equal to the first ratio, based on the foregoing steps, quality of a shot image can be improved.

Optionally, the method further includes:

performing demosaicing on the first image data by using the ISP second module in a thumbnail stream to obtain data in an RGB format; and performing RGB processing or YUV processing on the data in the RGB format by using the ISP third module to obtain the data in the YUV format, to output a thumbnail.

Therefore, in a case that the zoom ratio is equal to the first ratio, based on the foregoing steps, quality of a thumbnail can be improved.

Optionally, the method further includes:

performing demosaicing on the first image data by using the ISP second module in a preview path to obtain data in an RGB format; and performing RGB processing or YUV processing on the data in the RGB format by using the ISP third module to obtain the data in the YUV format, to output a preview image.

Therefore, in a case that the zoom ratio is equal to the first ratio, based on the foregoing steps, quality of a preview image can be improved.

In this embodiment of this application, an environmental illuminance of a shooting environment may further be used as a factor for deciding the image output manner of the sensor.

In a possible implementation, the method further includes:

obtaining an environmental illuminance of the current shooting scene; and determining the image output manner of the camera based on the environmental illuminance, the zoom ratio, and the dynamic range.

In a possible implementation, the camera performs image output in the first mode when the zoom ratio is greater than or equal to the second ratio, the environmental illuminance is a low illuminance, and the dynamic range meets the first DR constraint condition.

In a possible implementation, the camera performs image output in the second mode when the zoom ratio is greater than or equal to the second ratio, the environmental illuminance is a low illuminance, and the dynamic range does not meet the first DR constraint condition.

Therefore, when the zoom ratio is greater than or equal to the second ratio and the environmental illuminance is a low illuminance scene, in the high dynamic range, image output is performed in the DCG mode, which helps to improve a dynamic range of a shot image; and in the low dynamic range, the binning mode is used.

In the foregoing implementation, post-path processing may remain the same in some cases. Specifically, in the following cases: in a case that the camera performs image output in the first mode when the zoom ratio is greater than the first ratio and less than the second ratio and the dynamic range meets the first DR constraint condition, or in a case that the camera performs image output in the second mode when the zoom ratio is greater than the first ratio and less than the second ratio and the dynamic range does not meet the first DR constraint condition, or in a case that the camera performs image output in the first mode when the zoom ratio is greater than or equal to the second ratio, the environmental illuminance is a low illuminance scene, and the dynamic range meets the first DR constraint condition, or in a case that the camera performs image output in the second mode when the zoom ratio is greater than or equal to the second ratio, the environmental illuminance is a low illuminance scene, and the dynamic range does not meet the first DR constraint condition, the post-path processing may remain the same.

In the foregoing cases, the camera outputs third image data, where the first image format is used for the third image data; and the third image data is stored in the first buffer, and the method further includes:

receiving a second operation of the user, where the second operation is used for triggering shooting; and obtaining the third image data from the first buffer in response to the second operation;

performing image processing on the third image data by using the postprocessing algorithm module or the ISP second module to obtain fourth image data; and performing cropping and upsampling on the fourth image data by using the postprocessing algorithm module or the ISP third module to output the shot image.

Therefore, for the foregoing cases, based on the foregoing steps, quality of a shot image can be improved.

In the foregoing cases, optionally, the method further includes:

performing demosaicing on the third image data by using the ISP second module in the thumbnail stream to obtain the data in the RGB format; and performing RGB processing or YUV processing on the data in the RGB format by using the ISP third module to obtain the data in the YUV format, and performing cropping and upsampling on the data in the YUV format to output a thumbnail.

Therefore, based on the foregoing steps, quality of a thumbnail can be improved.

In the foregoing cases, optionally, the method further includes:

performing demosaicing on the third image data by using the ISP second module in the preview path to obtain the data in the RGB format; and performing RGB processing or YUV processing on the data in the RGB format by using the ISP third module to obtain the data in the YUV format, and performing cropping and upsampling on the data in the YUV format to output the preview image.

Therefore, based on the foregoing steps, quality of a preview image can be improved.

In a possible implementation, the method further includes:

performing, by the camera, image output in a third mode when the zoom ratio is greater than or equal to the second ratio, where the environmental illuminance is a high illuminance, and the dynamic range meets the first DR constraint condition. The third mode is a non-binning+cropping mode.

Therefore, in a case that the zoom ratio is greater than or equal to the second ratio and the environmental illuminance is a high illuminance scene, when the dynamic range is the high dynamic range, better image definition can be ensured by using the non-binning+cropping mode. In addition, a dynamic range of a shooting scene can be improved by performing a multi-frame postprocessing algorithm on long and short exposure frames. In other words, a definition requirement of image quality of a shooting scene is considered in the use of the third mode.

In a possible implementation, the method further includes:

performing, by the camera, image output in a third mode when the zoom ratio is greater than or equal to the second ratio, where the environmental illuminance is a high illuminance, and the dynamic range does not meet the first DR constraint condition.

Therefore, in a case that the zoom ratio is greater than or equal to the second ratio and the environmental illuminance is a high illuminance scene, when the dynamic range is the low dynamic range, definition is a prioritized factor. Therefore, the sensor performs image output in the non-binning+cropping mode, so that definition of an image can be improved.

In a case that the camera performs image output in the third mode, the post-path processing may remain the same. Optionally, data outputted by the camera is fifth image data, and a second image format is used for the fifth image data; and the performing image processing based on image data outputted by the camera includes:

performing Bayer image reconstruction on the fifth image data by using an ISP first module in the preview path to obtain sixth image data, where the first image format is used for the sixth image data;

performing demosaicing on the sixth image data by using the ISP second module to obtain the data in the RGB format; and performing RGB processing or YUV processing on the data in the RGB format by using the ISP third module to obtain the data in the YUV format, to output the preview image.

Therefore, based on the foregoing steps, quality of a preview image at a high ratio and a high illuminance can be improved.

Optionally, the fifth image data is stored in the first buffer, and the method further includes:

receiving a third operation of the user, where the third operation is used for triggering shooting; and obtaining the fifth image data from the first buffer in response to the third operation; and the performing image processing based on image data outputted by the camera includes:

performing Bayer image reconstruction on the fifth image data by using the postprocessing algorithm module to obtain seventh image data, where the first image format is used for the seventh image data;

performing demosaicing on the seventh image data by using the ISP second module to obtain the data in the RGB format; and performing RGB processing or YUV processing on the data in the RGB format by using the ISP third module to obtain the data in the YUV format, to output the shot image.

Optionally, the postprocessing algorithm module may further perform multi-frame fusion, so that a dynamic range of a shot image is improved.

Therefore, based on the foregoing steps, quality of a shot image at a high ratio and a high illuminance can be improved.

Optionally, the method further includes:

performing Bayer image reconstruction on the fifth image data by using the ISP first module in the thumbnail stream to obtain data in a Bayer format;

performing demosaicing on the data in the Bayer format by using the ISP second module to obtain the data in the RGB format; and performing RGB processing or YUV processing on the data in the RGB format by using the ISP third module to obtain the data in the YUV format, to output a thumbnail.

Therefore, based on the foregoing steps, quality of a thumbnail can be improved at a high ratio and a high illuminance can be improved.

According to a second aspect, an electronic device is provided, including units configured to perform any method according to the first aspect. The electronic device may be a terminal or a chip in the terminal. The electronic device includes an input unit, a display unit, and a processing unit.

When the electronic device is a terminal, the processing unit may be a processor, the input unit may be a communication interface, and the display unit may be a graphics processing module and a screen. The terminal may further include a memory, where the memory is configured to store computer program code, and when the processor executes the computer program code stored in the memory, the terminal is enabled to perform any method in the first aspect.

When the electronic device is a chip in a terminal, the processing unit may be a logical processing unit in the chip, the input unit may be an output interface, a pin, a circuit, or the like, and the display unit may be a graphics processing unit in the chip. The chip may further include a memory, where the memory may be a memory (for example, a register or a buffer) in the chip, or may be a memory (for example, a read-only memory or a random access memory) located outside the chip. The memory is configured to store computer program code, and when the processor executes the computer program code stored in the memory, the chip is enabled to perform any method in the first aspect.

In an implementation, the processing unit is further configured to: turn on the camera;

obtain a zoom ratio and a dynamic range of a current shooting scene;

determine an image output manner of the camera based on the zoom ratio and the dynamic range;

invoke the camera to perform image output in a first mode when the zoom ratio is greater than or equal to a first ratio and less than a second ratio and the dynamic range meets a first dynamic range DR constraint condition; and perform image processing based on image data outputted by the camera.

In a possible implementation, the processing unit is further configured to: when the zoom ratio is greater than or equal to the first ratio and less than the second ratio and a value of the dynamic range does not meet the first DR constraint condition, invoke the camera to perform image output in a second mode.

In a possible implementation, in a case that the camera performs image output in the first mode when the zoom ratio is equal to the first ratio and the value of the dynamic range meets the first DR constraint condition or in a case that the camera performs image output in the second mode when the zoom ratio is equal to the first ratio and the value of the dynamic range does not meet the first DR constraint condition, the camera outputs first image data, where a first image format is used for the first image data; and the first image data is stored in a first buffer.

The input unit is configured to receive a first operation of a user, where the first operation is used for triggering shooting; and that the processing unit is configured to perform the image processing based on the image data outputted by the camera specifically includes: obtaining the first image data from the first buffer in response to the first operation; invoking a postprocessing algorithm module or an image signal processor ISP second module to perform image processing on the first image data to obtain second image data; and invoking an ISP third module to perform RGB processing or YUV processing on the second image data to obtain data in a YUV format, to output a shot image.

In a possible implementation, in a thumbnail stream, the processing unit is further configured to: invoke the ISP second module to perform demosaicing on the first image data to obtain data in an RGB format; and invoke the ISP third module to perform RGB processing or YUV processing on the data in the RGB format to obtain the data in the YUV format, to output a thumbnail.

In a possible implementation, in a preview path, the processing unit is further configured to: invoke the ISP second module to perform demosaicing on the first image data to obtain data in an RGB format; and invoke the ISP third module to perform RGB processing or YUV processing on the data in the RGB format to obtain the data in the YUV format, to output the preview image.

In a possible implementation, the processing unit is further configured to: obtain an environmental illuminance of the current shooting scene; and determine the image output manner of the camera based on the environmental illuminance, the zoom ratio, and the dynamic range.

In a possible implementation, the processing unit is further configured to invoke the camera to perform image output in the first mode when the zoom ratio is greater than or equal to the second ratio, the environmental illuminance is a low illuminance, and the dynamic range meets the first DR constraint condition.

In a possible implementation, the processing unit is further configured to invoke the camera to perform image output in the second mode when the zoom ratio is greater than or equal to the second ratio, the environmental illuminance is a low illuminance, and the dynamic range does not meet the first DR constraint condition.

In a possible implementation, in the following cases: in a case that the camera performs image output in the first mode when the zoom ratio is greater than the first ratio and less than the second ratio and the dynamic range meets the first DR constraint condition, or in a case that the camera performs image output in the second mode when the zoom ratio is greater than the first ratio and less than the second ratio and the dynamic range does not meet the first DR constraint condition, or in a case that the camera performs image output in the first mode when the zoom ratio is greater than or equal to the second ratio, the environmental illuminance is a low illuminance scene, and the dynamic range meets the first DR constraint condition, or in a case that the camera performs image output in the second mode when the zoom ratio is greater than or equal to the second ratio, the environmental illuminance is a low illuminance scene, and the dynamic range does not meet the first DR constraint condition, the post-path processing remains the same.

Optionally, the camera outputs third image data, where the first image format is used for the third image data; and the third image data is stored in the first buffer, and the method further comprises:

receiving a second operation of the user, where the second operation is used for triggering shooting; and that the processing unit is configured to perform image processing based on the image data outputted by the camera specifically includes:

obtaining the third image data from the first buffer in response to the second operation;

the processing unit is further configured to invoke the postprocessing algorithm module or the ISP second module to perform image processing on the third image data to obtain fourth image data; and the processing unit is further configured to invoke the postprocessing algorithm module or the ISP third module to perform cropping and upsampling on the fourth image data to output the shot image.

In a possible implementation, the processing unit is further configured to: invoke the ISP second module to perform demosaicing on the third image data in the thumbnail stream to obtain the data in the RGB format; and invoke the ISP third module to perform RGB processing or YUV processing on the data in the RGB format to obtain the data in the YUV format, and perform cropping and upsampling on the data in the YUV format to output a thumbnail.

In a possible implementation, in the preview path, the processing unit is further configured to: invoke the ISP second module to perform demosaicing on the third image data to obtain the data in the RGB format; and invoke the ISP third module to perform RGB processing or YUV processing on the data in the RGB format to obtain the data in the YUV format, and perform cropping and upsampling on the data in the YUV format to output the preview image.

In a possible implementation, the processing unit is further configured to invoke the camera to perform image output in a third mode when the zoom ratio is greater than or equal to the second ratio, where the environmental illuminance is a high illuminance, and the dynamic range meets the first DR constraint condition.

In a possible implementation, the processing unit is further configured to invoke the camera to perform image output in a third mode when the zoom ratio is greater than or equal to the second ratio, where the environmental illuminance is a high illuminance, and the dynamic range does not meet the first DR constraint condition.

In a possible implementation, data outputted by the camera is fifth image data, and a second image format is used for the fifth image data; and that the processing unit is configured to perform image processing based on the image data outputted by the camera specifically includes:

invoking an ISP first module to perform Bayer image reconstruction on the fifth image data in the preview path to obtain sixth image data, where the first image format is used for the sixth image data;

invoking the ISP second module to perform demosaicing on the sixth image data to obtain the data in the RGB format; and invoke the ISP third module to perform RGB processing or YUV processing on the data in the RGB format to obtain the data in the YUV format, to output the preview image.

In a possible implementation, the fifth image data is stored in the first buffer, and the input unit is further configured to receive a third operation of the user, where the third operation is used for triggering shooting;

the processing unit is further configured to obtain the fifth image data from the first buffer in response to the third operation; and that the processing unit is configured to perform image processing based on the image data outputted by the camera specifically includes:

invoking the postprocessing algorithm module to perform Bayer image reconstruction on the fifth image data to obtain seventh image data, where the first image format is used for the seventh image data;

invoking the ISP second module to perform demosaicing on the seventh image data to obtain the data in the RGB format; and invoking the ISP third module to perform RGB processing or YUV processing on the data in the RGB format to obtain the data in the YUV format, to output the shot image.

The processing unit is further configured to: invoke the ISP first module to perform Bayer image reconstruction on the fifth image data to obtain data in a Bayer format;

invoke the ISP second module to perform demosaicing on the data in the Bayer format to obtain the data in the RGB format; and invoke the ISP third module to perform RGB processing or YUV processing on the data in the RGB format to obtain the data in the YUV format, to output a thumbnail.

According to a third aspect, a computer-readable storage medium is provided and stores computer program codes. The computer program codes, when run by an electronic device, cause the electronic device to perform any method in the first aspect.

According to a fourth aspect, a computer program product is provided. The computer program product includes computer program code. When the computer program code is run by an electronic device, the electronic device is enabled to perform the method in any implementation of the first aspect.

DESCRIPTION OF EMBODIMENTS

The following describes technical solutions of embodiments in this application with reference to accompanying drawings.

In embodiments of this application, "a plurality of" means two or more than two unless otherwise specified.

Embodiments of this application are applicable to an electronic device. The electronic device may be a mobile phone, a smart screen, a tablet personal computer, a wearable electronic device, a vehicle-mounted electronic device, an augmented reality (AR) device, a virtual reality (VR) device, a notebook computer, an ultra-mobile personal computer (UMPC), a netbook, a personal digital assistant (PDA), a projector, or the like.

The electronic device in this embodiment of this application is equipped with an image acquisition device (for example, a camera lens).

A specific type of the electronic device is not limited in this embodiment of this application. An example in which the electronic device is a mobile phone is used to describe the image processing method in embodiments of this application below.

Figure 1A:
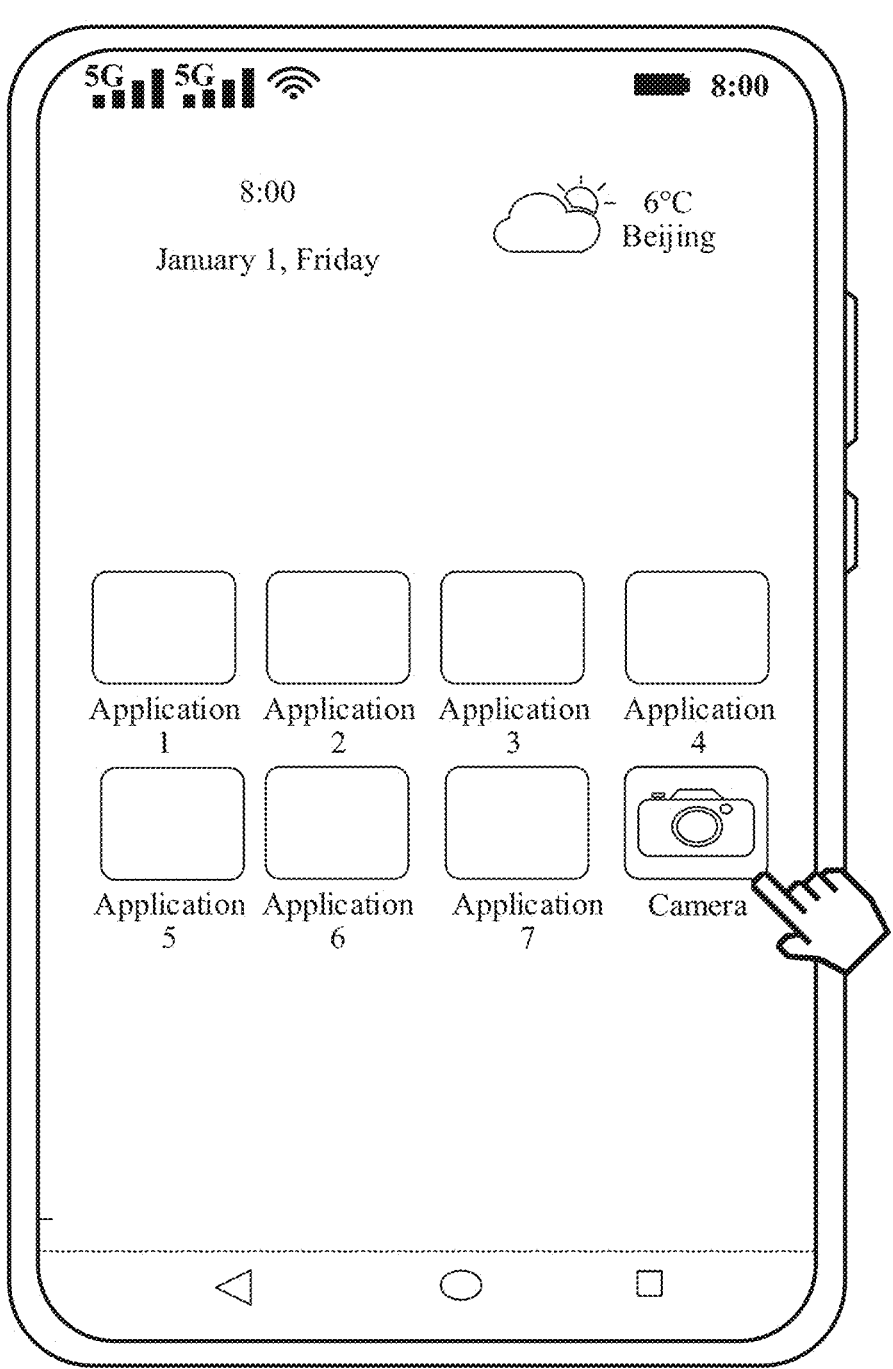
FIG. 1A, FIG. 1B, FIG. 1C, and FIG. 1D are diagrams showing an example of an application scenario according to an embodiment of this application.
Figure 1B:
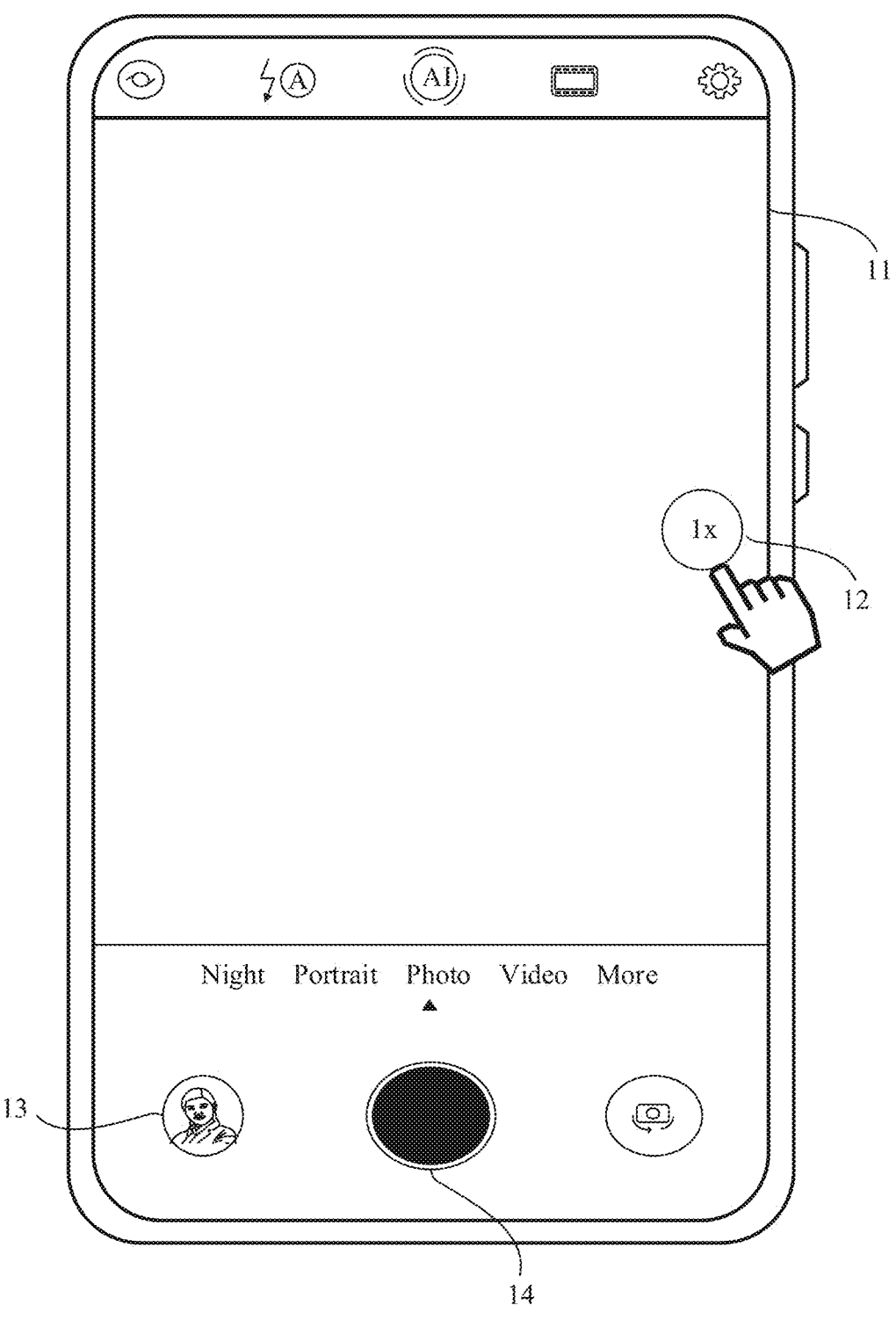

The following description is made with reference to a scenario in FIG. 1A, FIG. 1B, FIG. 1C, and FIG. 1D as an example. FIG. 1A, FIG. 1B, FIG. 1C, and FIG. 1D are diagrams showing an example of an application scenario according to an embodiment of this application. In an interface of a mobile phone shown in FIG. 1A, the interface may display a plurality of application programs: an application 1, an application 2, . . . , an application 7, and a camera application program. A user taps the camera application program, and the mobile phone turns on a camera. After the camera is run, for the interface of the mobile phone, an interface shown in FIG. 1B is displayed. The interface may be referred to as a shooting interface of the camera. The shooting interface may include a viewfinder frame 11, a zoom ratio 12 (1× by default), an album icon 13, a shooting control 14, a camera rotation control, and the like. The user may perform shooting by tapping the shooting control 14. In the interface, a thumbnail is displayed for the album icon 13. The camera rotation control may be configured to switch between cameras.

The viewfinder frame 11 is configured to obtain and shoot a preview image, and may display the preview image in real time.

The mobile phone supports digital zoom. When using a shooting function, the user may perform an operation on a touchscreen to select from different zoom ratios.

Figure 1C:
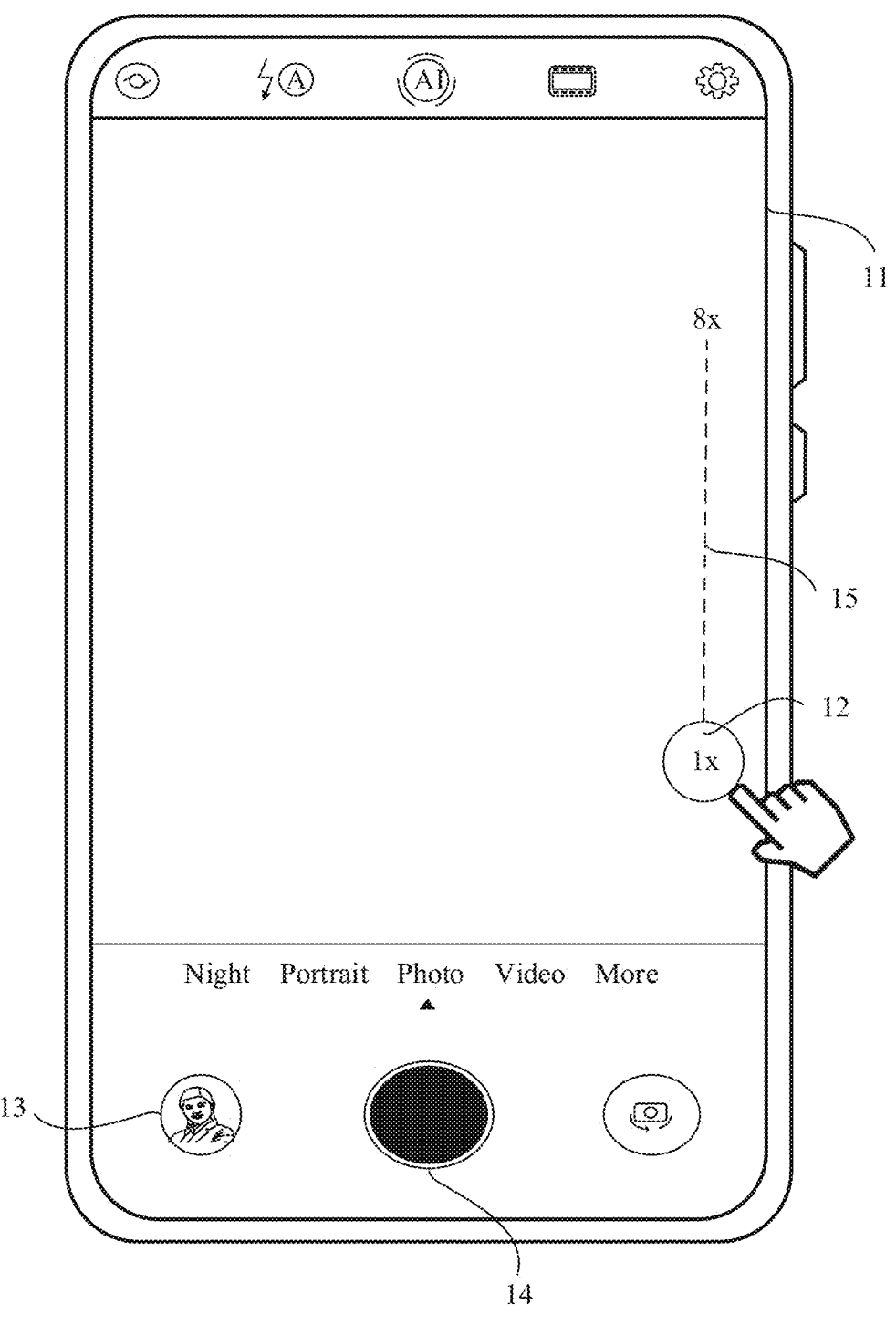
Figure 1D:
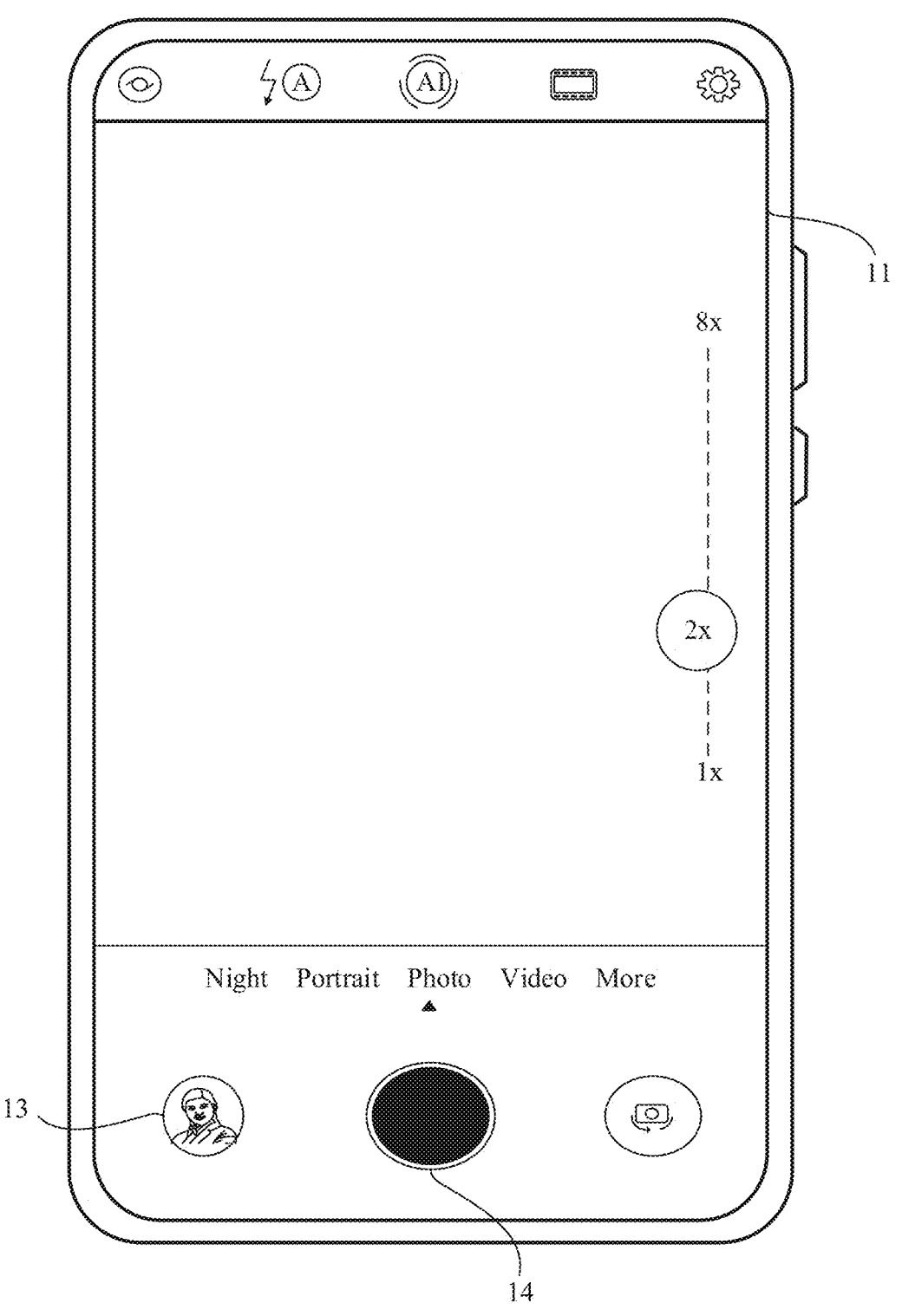

In an example, as shown in FIG. 1B, the user taps the zoom ratio 12 in FIG. 1B, an interface shown in FIG. 1C is displayed, and a selection option 15 (for example, the maximum zoom ratio is 8×, and the minimum zoom ratio is 1×) of the zoom ratio appears. When the user drags up the zoom ratio 12 in the selection option 15 and releases when the zoom ratio is 2×, an interface shown in FIG. 1D is displayed. That is, the zoom ratio of 2× is selected. Certainly, after the zoom ratio is selected, the selection option 15 of the zoom ratio may be hidden. That is, the interface displays that the selected zoom ratio is 2×.

It should be understood that a shooting scenario in FIG. 1A, FIG. 1B, FIG. 1C, and FIG. 1D merely represents an application scenario of this application. This does not limit embodiments of this application. In fact, embodiments of this application are also applicable to other scenarios using a camera, for example, a video recording scenario, a video call scenario, a video livestreaming scenario, or the like.

It should be understood that FIG. 1B is a schematic diagram of an interface when the user performs shooting in a portrait mode of the mobile phone. For example, the user may perform shooting in a landscape mode of the mobile phone.

It should further be understood that upper and lower limits (that is, the maximum zoom ratio and the minimum zoom ratio) of the selection option 15 of the zoom ratio shown in FIG. 1C may depend on the implementation of the mobile phone. The upper and lower limits shown in FIG. 1C are merely an example. This is not limited in embodiments of this application.

It should further be understood that a position of the selection option 15 of the zoom ratio shown in FIG. 1C in the interface is also merely an example. This is not limited in embodiments of this application.

In some embodiments, the mobile phone may use a quadra color filter array (Quadra CFA) sensor camera. Key components of the camera include an optical lens (lens) and an image sensor (sensor). After the camera is turned on, the sensor may output images based on an acquired image signal.

A dynamic range dynamic range of a scene affects quality of a shot image. Because a dynamic range of the image sensor is limited, during shooting of a high dynamic range scene, a dynamic range of a scene that can be captured by the image sensor is usually improved in a manner of multi-exposure fusion. In a current multi-exposure image technology, different exposure frames usually have different starting exposure time and total exposure time. As a result, during shooting of a moving object, an image obtained through fusion is prone to a ghosting problem, affecting image quality and poor user experience.

In view of this, embodiments of this application provide an image processing method and an electronic device. An image output manner of a camera is determined based on a zoom ratio and a dynamic range of a shooting scene. A sensor performs image output in a DCG mode when the zoom ratio is greater than or equal to a first ratio and less than a second ratio and the dynamic range is a high dynamic range, which can improve image quality in a high dynamic shooting scene, and can avoid a ghosting problem, so that shooting experience of a user is improved.

In addition, in the image processing method in embodiments of this application, three factors including a zoom ratio, an environmental illuminance, and a dynamic range value of an acquisition scene are taken into consideration. An image output manner of the sensor is controlled in different shooting scenes. Different shooting procedures are designed for different shooting scenes to take full advantage of components, so that image quality is improved in the scenes, thereby improving user experience. In embodiments of this application, the image output manner of the sensor depends on a dynamic range value, a zoom ratio, and an environmental illuminance of a shooting scene.

For convenience of understanding, some terms involved in embodiments of this application are briefly introduced first prior to introduction to the image processing method in embodiments of this application.

In embodiments of this application, the sensor supports outputting images in a first mode, a second mode, and a third mode. It is generally described that the first mode is a dual conversion gain (DCG) mode. The second mode is a binning mode. The third mode is a non-binning+cropping mode. The DCG mode is essentially also a combined mode. The DCG mode is described below in detail.

The DCG mode is adding a DCG to cmos pixels to endow the sensor with both high sensitivity and a high dynamic range. The DCG includes a high conversion gain (HCG) and a low conversion gain (LCG). The HCG corresponds to a long exposure frame, and has a good signal-to-noise ratio in a dark area. The LCG corresponds to a short exposure frame, which can ensure good highlight details. When the sensor works in the DCG mode, the sensor separately obtains a long exposure frame and a short exposure frame, and then fuse the long exposure frame and the short exposure frame. An image frame obtained through fusion is used as an image outputted by the sensor. In other words, an image outputted by the sensor in the DCG mode is the image frame obtained by fusing the long exposure frame and the short exposure frame. After the fusion of the two, there is no longer a ghosting problem, and the dynamic range is improved.

The "exposure" in the exposure frames (including the long exposure frame and the short exposure frame) is an exposure value (EV) rather than exposure time. The exposure value may be determined by the exposure time and a gain together.

For example, the exposure value satisfies a formula: $EV=Gain*Exposure\ time$. EV represents the exposure value. Factors affecting Gain include, but are not limited to, CG and Iso. The CG is a conversion again, and Iso is a film speed.

It may be understood that the foregoing is only described by using an example in which the long exposure frame and the short exposure frame are used for the DCG, but the embodiments of the application are not limited thereto. For example, in addition to the HCG and the LCG, the DCG mode may further include more CGs (for example, CGs may be added by adding capacitors to hardware). Each CG may correspondingly output a corresponding image frame.

In the binning mode, charges sensed by adjacent pixels are added together and are read in a mode of one pixel. Image data outputted in the binning mode is in a Bayer format (bayer raw).

Non-binning mode: Images with the same resolution as the sensor are provided in the non-binning mode. The sensor performs image output in the non-binning mode. An image format of the sensor is a quadra raw format rather than bayer raw.

To facilitate ISP processing, quadra raw obtained in the non-binning mode needs to be converted into bayer raw.

In Bayer image reconstruction (Remosaic), data in the non-binning mode is converted into standard bayer raw by rearranging pixels, in other words, exchanging pixels. In embodiments of this application, Remosaicing may be implemented by using a postprocessing algorithm module or an ISP first module.

Demosaicing (Demosaic) is used for converting data in a Bayer format into data in an RGB format. Demosaicing may be understood as color interpolation. That is, real world colors that meets a color display device are restored from Bayer data obtained from the sensor.

Cropping: An acquired image is cropped to obtain an image with a field of view corresponding to a zoom ratio. Cropping may be implemented by using a crop function. For example, a field of view image corresponding to 2× is obtained by using the crop function.

Upsampling is restoring a resolution of a raw image from a resolution of a feature image. Upsampling may scale up an image by using a scale function. For example, after a 2× image is obtained, the 2× image is scaled up by using the scale function, to make a size of the image the same as that of a 1× image.

An environmental illuminance is light intensity of a shooting environment when a user performs shooting. A value of the environmental illuminance may be represented by using the following indicators: a lighting value (LV), a lux, a luxindex, or the like.

The LV is used for estimating an ambient lightness, and a specific calculation formula thereof is as follows:

$$LV = 10 * \log_2\left(\frac{\text{Aperture}^2}{\text{Exposure}} * \frac{100}{Iso} * \frac{\text{Luma}}{46}\right)$$

Exposure is an exposure time, Aperture is an aperture size, Iso is sensitivity, and Luma is an average value of Y of an image in an XYZ color space.

In embodiments of this application, a format of image data outputted in the binning mode or the DCG mode is named a first image format. For example, the first image format is bayer raw.

In embodiments of this application, a format of image data outputted in the non-binning mode (or a non-binning+ cropping mode) is named a second image format. For example, the second image format is quadra raw.

For different dynamic range scenes, different zoom ratios, and different environmental illuminances, the sensor in embodiments of this application use appropriate image output manners, so that image quality is improved. The following provides a description with reference to FIG. 2.

Figure 2:
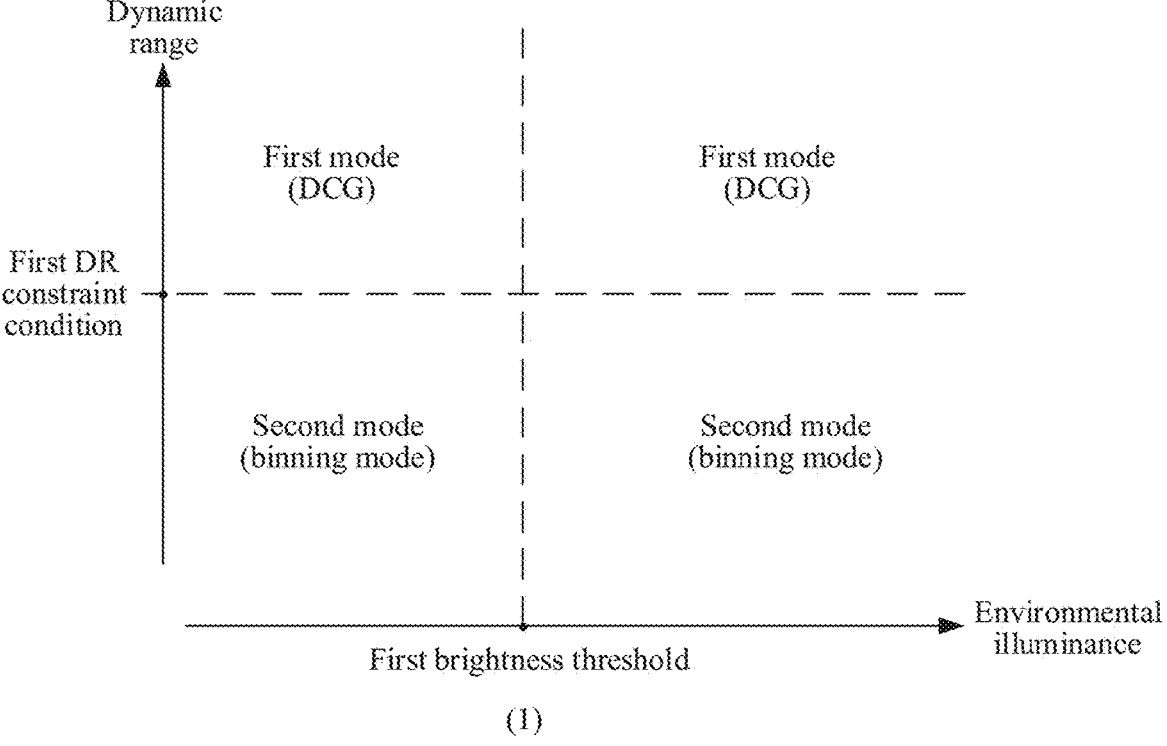
FIG. 2 is a schematic diagram of image output manners corresponding to a sensor at different zoom ratios, different dynamic ranges, and different environmental illuminances according to an embodiment of this application.
Figure 2:
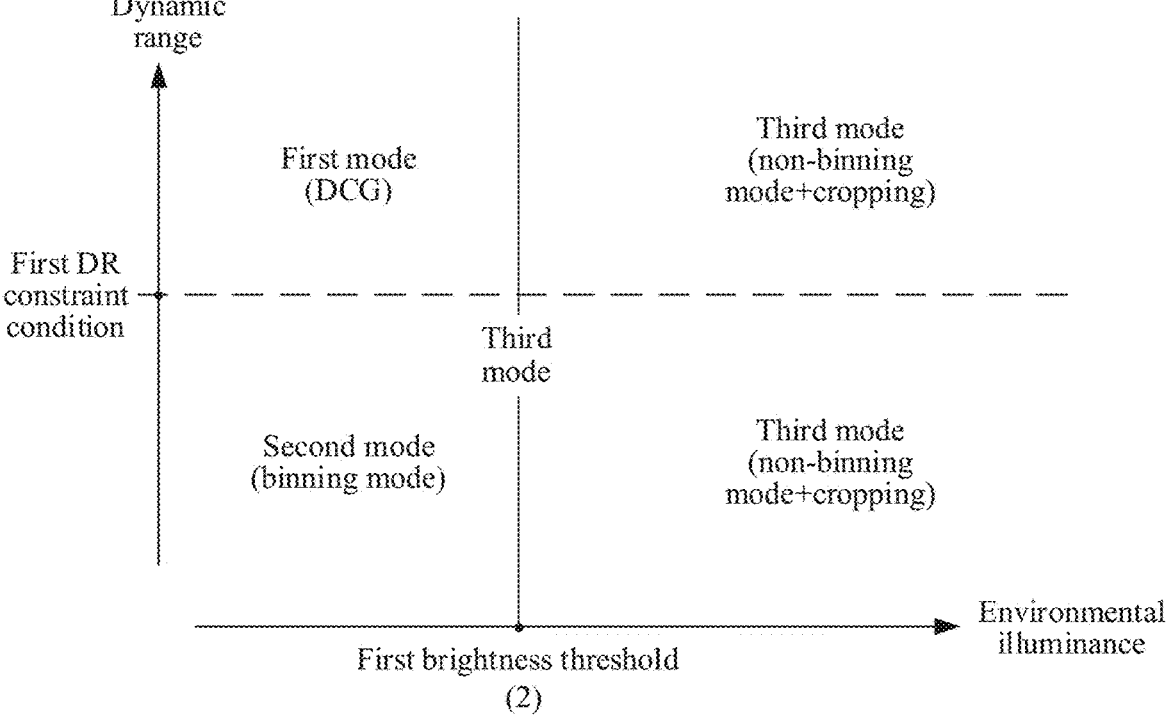

FIG. 2 is a schematic diagram of image output manners corresponding to a sensor at different zoom ratios, different dynamic range scenes, and different environmental illuminances according to an embodiment of this application.

(1) in FIG. 2 is a schematic diagram of an image output mode of the sensor in a case that a zoom ratio is greater than or equal to a first ratio and less than a second ratio. (2) in FIG. 2 is a schematic diagram of an image output mode of the sensor in a case that the zoom ratio is greater than or equal to the second ratio. The second ratio is greater than the first ratio. The second ratio is a zoom ratio greater than or equal to 2. For example, the first ratio is 1×, and the second ratio is 2×.

In (1) in FIG. 2, the environmental illuminance sequentially increases from left to right, and the dynamic range sequentially increases from bottom to top. Similarly, change trends of the environmental illuminance and the dynamic range are the same in (2) in FIG. 2.

For the environmental illuminance, in FIG. 2, the environmental illuminance is divided into a low illuminance scene (or a dark light environment) and a high illuminance scene (or a bright light environment) based on a first brightness threshold in embodiments of this application.

For example, if the environmental illuminance is greater than or equal to the first brightness threshold, the scene is a high illuminance scene; and if the environmental illuminance is less than the first brightness threshold, the scene is a low illuminance scene.

It should be understood that a case in which the value of the environmental illuminance is equal to the first brightness threshold is classified as a high illuminance scene. However, embodiments of the application are not limited thereto. For example, a case in which the environmental illuminance is equal to the first brightness threshold may be classified as a low illuminance scene. The following provides a description using a high illuminance scene and a low illuminance scene.

In a possible implementation, the environmental illuminance is represented by LV, and correspondingly, the first brightness threshold is a first LV value.

In a possible implementation, the environmental illuminance is represented by luxindex, and correspondingly, the first brightness threshold is a luxindex value. When the luxindex value is larger, the environmental illuminance is lower. When the luxindex value is smaller, the environmental illuminance is higher.

For a dynamic range, the dynamic range may be divided into a high dynamic range and a low dynamic range based on a first DR constraint condition. If a dynamic range value of a shooting scene meets the first DR constraint condition, the dynamic range is a high dynamic range. If a dynamic range value of a shooting scene does not meet the first DR constraint condition, the dynamic range is a low dynamic range.

Optionally, the first DR constraint condition (the first DR constraint condition may be specifically a DR value) may be determined based on a histogram of a RAW image of a shooting scene. Specifically, a dynamic range of a scene is determined based on a percentage of overexposed pixels and a percentage of underexposed pixels in an image.

For example, based on the histogram of the RAW image of the shooting scene, the first DR constraint condition is determined based on a first proportion, a second proportion, and a third proportion. The first proportion is a proportion of pixels with a pixel value greater than a first pixel value in an image pixel distribution, and the second proportion is a proportion of pixels with a pixel value less than a second pixel value in the image pixel distribution. When both the first proportion and the second proportion are greater than the third proportion, it is considered that the first DR constraint condition is met, and in this case, the dynamic range is defined as the low dynamic range. When both the first proportion and the second proportion are not greater than the third proportion (in an example, any one of the first proportion and the second proportion is not greater than the third proportion, or in another example, neither of the first proportion and the second proportion is greater than the third proportion), it is considered that the first DR constraint condition is not met, and in this case, the dynamic range is defined as the low dynamic range. It may be understood that the description about the first DR constraint condition is merely an exemplary description, and embodiments of this application are not limited thereto.

It should be understood that the description about the first brightness threshold and the first DR constraint condition is applicable to both (1) in FIGS. 2 and (2) in FIG. 2.

(1) in FIG. 2 essentially shows two cases when the zoom ratio is greater than or equal to the first ratio and less than the second ratio. The classification of the two cases depends on whether the dynamic range is a high dynamic range or a low dynamic range. Details are as follows:

Case 1: As shown in (1) in FIG. 2, when the zoom ratio is greater than or equal to the first ratio and less than the second ratio and the dynamic range is a high dynamic range, regardless of whether the environmental illuminance is a high illuminance scene or a low illuminance scene, the sensor performs image output in the first mode, that is, the DCG mode. In a high dynamic range scene, the use of the DCG mode can improve the dynamic range of the scene, and helps to improve image quality.

Case 2: As shown in (1) in FIG. 2, when the zoom ratio is greater than or equal to the first ratio and less than the second ratio and the dynamic range is a low dynamic range scene, regardless of whether the environmental illuminance is a high illuminance scene or a low illuminance scene, the sensor performs image output in the second mode, that is, the binning mode. In a low dynamic range, image output in the binning mode can improve a signal-to-noise ratio.

(2) in FIG. 2 shows four cases when the zoom ratio is greater than or equal to the second ratio. The classification of the four cases depends on whether the dynamic range is a high dynamic range or a low dynamic range, and in addition, further depends on whether the environmental illuminance is a high illuminance scene or a low illuminance scene.

Case 3: As shown in (2) in FIG. 2, when the zoom ratio is greater than or equal to the second ratio and the environmental illuminance is a low illuminance scene, if the dynamic range is a high dynamic range, the sensor performs image output in the DCG mode.

Case 4: As shown in (2) in FIG. 2, when the zoom ratio is greater than or equal to the second ratio and the environmental illuminance is a low illuminance scene, if the dynamic range is a low dynamic range, the sensor performs image output in the binning mode.

Case 5: As shown in (2) in FIG. 2, when the zoom ratio is greater than or equal to the second ratio and the environmental illuminance is a high illuminance scene, if the dynamic range is a high dynamic range, the sensor performs image output in the third mode, that is, the non-binning mode+cropping.

Case 6: As shown in (2) in FIG. 2, when the zoom ratio is greater than or equal to the second ratio and the environmental illuminance is a high illuminance scene, if the dynamic range is a low dynamic range, the sensor also performs image output in the third mode, that is, the non-binning mode+cropping.

In summary, in shooting scenes with different dynamic ranges, different environmental illuminances, and different zoom ratios, the sensor may perform image output in the first mode (DCG), the second mode (the binning mode), and the third mode (the non-binning mode and cropping).

It should be noted that, regardless of the manner in which the sensor performs image output, images outputted by the sensor have the same bit size (or bit width) (for example, the bit size is 12 bits). In this way, it is ensured that images inputted into an ISP module also have the same bit size.

In the foregoing cases, as a shooting scene changes, the sensor may switch between the binning mode and the DCG mode (including switching from the DCG mode to the binning mode and switching from the binning mode and the DCG mode). To avoid frequent switching, a first DR threshold and a second DR threshold are set to implement switching between the binning mode and the DCG mode. Relationships between a DR value of a shooting scene and the first DR threshold and the second DR threshold are determined through comparison to determine whether to switch between image output manners of the sensor. The DR value is used for representing a dynamic range of the shooting scene. For example, if the DR value of the shooting scene is greater than the first DR threshold, the sensor switches from the binning mode to the DCG mode; and if the DR value of the shooting scene is less than the second DR threshold, the sensor switches from the DCG mode to the binning mode. The first DR threshold is greater than the second DR threshold. The DR value of the shooting scene may be calculated according to the histogram of the RAW image.

For example, it is assumed that the first DR threshold is 1000, and the second DR threshold is 800. When a DR value of an image is greater than 1000, the sensor switches from the binning mode to the DCG mode. As a shooting scene changes, the DR value of the image changes accordingly. If the DR value decreases, switching is not performed immediately, and instead the sensor switches from the DCG mode to the binning mode when it is determined that the DR value of the shooting scene is less than 800, to avoid frequent switching. It may be understood that the value of the DR thresholds are also merely an exemplary description, and embodiments of this application are not limited thereto.

In addition, in the foregoing cases, as a shooting scene changes, the sensor may also switch between the non-binning+cropping mode and the DCG mode (including switching from the DCG mode to the non-binning+cropping mode and switching from the non-binning+cropping mode and the DCG mode). For example, in a high illuminance and high dynamic range scene, when the zoom ratio is switched from 1× to 2× or a ratio greater than 2×, the image output manner of the sensor is switched from the DCG mode to the non-binning+cropping mode. In another example, in a high dynamic range scene with a zoom ratio of 2×, when the environmental illuminance is switched from a low illuminance scene to a high illuminance scene, the image output manner of the sensor is switched from the DCG mode to the non-binning+cropping mode. In a scenario of switching between the non-binning+cropping mode and the DCG mode, smooth switching of a brightness and a dynamic range can be implemented by adjusting a module such as a tone mapping-related module or an automatic exposure (AE) module in an ISP.

The tone mapping module is configured to: calculate an average brightness of a scene according to a current scene, then select an appropriate brightness domain based on the average brightness, and then map the entire scene into the brightness domain to obtain a correct result. The tone mapping module includes global tone mapping and local tone mapping.

The AE module is configured to automatically adjust exposure time of the sensor to adjust image brightness when a lighting condition of an external environment changes.

The technical effect when the sensor uses the corresponding image output modes shown in FIG. 2 at different dynamic ranges, different zoom ratios, and different environmental illuminances is described below.

In a case that the zoom ratio is equal to the first ratio (or the zoom ratio is greater than the first ratio and less than the second ratio) and the environmental illuminance is a high illuminance scene, when the dynamic range is a high dynamic range, the sensor performs image output in the DCG mode, which helps to improve a dynamic range of a shot image. When the dynamic range is a low dynamic range, the DCG mode does not need to be used, and the sensor performs image output in the binning mode. The selection of an appropriate image output manner helps to reduce power consumption of an electronic device. In addition, if the zoom ratio is equal to the first ratio, there is no loss in a resolution in the first ratio. In this case, a resolution of an image can meet a requirement.

In a case that the zoom ratio is equal to the first ratio (or the zoom ratio is greater than the first ratio and less than the second ratio) and the environmental illuminance is a low illuminance scene, when the dynamic range is a high dynamic range, the sensor performs image output in the DCG mode, which helps to improve a dynamic range of an image. When the dynamic range is a low dynamic range, the DCG mode does not need to be used, and the sensor performs image output in the binning mode, which helps to reduce power consumption of an electronic device. In addition, there is no loss in a resolution in the first ratio. Therefore, a resolution requirement of an image can be met.

In a case that the zoom ratio is equal to the first ratio (or the zoom ratio is greater than the first ratio and less than the second ratio) and the dynamic range is a high dynamic range scene, regardless of whether the environmental illuminance is a high illuminance scene or a low illuminance scene, the dynamic range is a prioritized factor. Therefore, the sensor performs image output in the DCG mode, which helps to improve a dynamic range of an image.

In a case that the zoom ratio is equal to the first ratio (or the zoom ratio is greater than the first ratio and less than the second ratio) and the dynamic range is a low dynamic range scene, regardless of whether the environmental illuminance is a high illuminance scene or a low illuminance scene, the dynamic range does not need to be taken into consideration. Therefore, the sensor performs image output in the binning mode. This further helps to improve a signal-to-noise ratio of an image in a low illuminance scene In a case that the zoom ratio is greater than or equal to the second ratio and the environmental illuminance is a high illuminance scene, when the dynamic range is the high dynamic range, a dynamic range of a preview scene is improved compared with image output in the DCG mode. In this case, the sensor performs image output in the non-binning+cropping mode. In this way, better image definition can be ensured. In addition, a dynamic range of a shooting scene can be improved by performing a multi-frame post-processing algorithm on long and short exposure frames (for example, which may be implemented by using a postprocessing algorithm module and/or an ISP module), so that better effect can be achieved in the shooting scene (a balance can be found between the image definition and the dynamic range). When the dynamic range is the low dynamic range, definition is a prioritized factor. Therefore, the sensor performs image output in the non-binning+cropping mode, so that definition of an image can be improved.

In a case that the zoom ratio is greater than or equal to the second ratio and the environmental illuminance is a low illuminance scene, the signal-to-noise ratio is a prioritized factor, and the binning mode is prioritized for image output. However, the DCG mode is also a binning mode. Therefore, when the dynamic range is a high dynamic range, the sensor usually performs image output in the DCG mode, which helps to improve a dynamic range of an image. When the dynamic range is a low dynamic range, the DCG mode does not need to be used, and the sensor performs image output in the binning mode, which helps to improve a signal-to-noise ratio of an image.

In a case that the zoom ratio is greater than or equal to the second ratio and the dynamic range is a high dynamic range scene, when the environmental illuminance is a low illuminance scene, both a signal-to-noise ratio and a dynamic range are factors that need to be taken into consideration. The DCG mode is also a binning mode. Therefore, the sensor performs image output in the DCG mode, which can ensure that a dynamic range is improved and further help to improve a signal-to-noise ratio of an image. When the environmental illuminance is a high illuminance scene, in this case, the sensor performs image output in the non-binning+cropping mode. Better image definition can be ensured. In addition, a dynamic range of a shooting scene can be improved by performing a multi-frame postprocessing algorithm on long and short exposure frames (for example, which may be implemented by using a postprocessing algorithm module and/or an ISP module), so that better effect can be achieved in the shooting scene (a balance is found between the image definition and the dynamic range). Therefore, the sensor does not perform image output in the DCG mode (image output in the DCG mode can improve a dynamic range of a preview scene), and instead image output is performed in the non-binning+cropping mode, which can improve definition of an image in the shooting scene.

In a case that the zoom ratio is greater than or equal to the second ratio and the dynamic range is a low dynamic range scene, when the environmental illuminance is a low illuminance scene, a signal-to-noise ratio of an image is a prioritized factor. To ensure a good film speed in dark light, the sensor performs image output in the binning mode, which helps to improve the signal-to-noise ratio of the image. When the environmental illuminance is a high illuminance scene, definition of an image is a prioritized factor. Therefore, the sensor performs image output in the non-binning+cropping mode, so that the definition of the image can be improved.

In a low dynamic range and low illuminance scene, regardless of an interval to which the zoom ratio belongs (greater than or equal to the first ratio and less than the second ratio or greater than or equal to the second ratio), a signal-to-noise ratio of an image is a prioritized factor. Therefore, the sensor performs image output in the binning mode, so that a good film speed in dark light can be ensured, which helps to improve the signal-to-noise ratio of the image.

In a low dynamic range and high illuminance scene, when the zoom ratio is equal to the first ratio, a resolution can meet a requirement, a factor of a dynamic range also does not need to be taken into consideration, and a requirement can be met when the sensor performs image output in the binning mode. When the zoom ratio is greater than the first ratio and less than the second ratio, the factor of the dynamic range also does not need to be taken into consideration. In addition, limited by a platform size, to avoid that an image outputted by the sensor is excessively large and affects a preview frame rate, the sensor still performs image output in the binning mode. When the zoom ratio is greater than or equal to the second ratio, a resolution of an image is a prioritized factor. Therefore, the sensor performs image output in the non-binning+cropping mode, which helps to improve the definition of the image.

In a high dynamic range and low illuminance scene, regardless of an interval to which the zoom ratio belongs (greater than or equal to the first ratio and less than the second ratio or greater than or equal to the second ratio), a signal-to-noise ratio is a prioritized factor, and the binning mode is prioritized for image output. The DCG mode is also a binning mode. Therefore, in a high dynamic range, the sensor usually performs image output in the DCG mode, which helps to improve a dynamic range of an image.

In a high dynamic range and high illuminance scene, when the zoom ratio is greater than or equal to the first ratio and less than the second ratio, the dynamic range is a prioritized factor. Therefore, the sensor performs image output in the DCG mode, which helps to improve a dynamic range of an image. When the zoom ratio is greater than or equal to the second ratio, a dynamic range of a preview scene is improved compared with image output in the DCG mode. In this case, the sensor performs image output in the non-binning+cropping mode. Therefore, better image definition can be ensured. In addition, a dynamic range of a shooting scene can be improved by performing a multi-frame postprocessing algorithm on long and short exposure frames (for example, which may be implemented by using a postprocessing algorithm module and/or an ISP module), so that better effect can be achieved in the shooting scene (a balance can be found between the image definition and the dynamic range).

In summary, in different scenarios, an appropriate image output mode is selected for the sensor in embodiments of this application, so that a balance can be found among power consumption, definition, and image quality. In addition, in embodiments of this application, the sensor can further implement smooth switching among three modes. In addition, it can be further implemented that images have the same color effect and brightness effect by universally controlling ISP parameters.

In addition, it may be understood that for a case in which the zoom ratio is less than the first ratio, whether to use a processing manner shown in (1) in FIG. 2 may depend on a specific implementation of a product. This is not specifically limited in this embodiment of this application. For example, when a zoom ratio selected by a user is greater than Ox and less than 1×, if the electronic device has an ultra wide angle camera, the electronic device may switch to the ultra wide angle camera for processing. In another example, when the zoom ratio selected by the user is greater than Ox and less than 1×, a camera may be not switched, and the processing manner shown in (1) in FIG. 2 is used.

In the foregoing Case 1 and Case 2, when the zoom ratio is equal to the first ratio, the image output manner of the sensor may be the DCG mode or may be the binning mode. In this case, after the sensor performs image output in the DCG mode or the binning mode, post-path processing remains the same. The "remains the same" means that when the zoom ratio is equal to the first ratio: (1) Processing of a preview stream when the sensor performs image output in the DCG mode is the same as processing of a preview stream when the sensor performs image output in the binning mode. (2) Processing of a shooting stream when the sensor performs image output in the DCG mode is the same as processing of a shooting stream when the sensor performs image output in the binning mode. (3) Processing of a thumbnail stream when the sensor performs image output in the DCG mode is the same as processing of a thumbnail stream when the sensor performs image output in the binning mode.

A post-path (including a preview path, a shooting path, and a thumbnail path) processing procedure when the zoom ratio is equal to the first ratio is described below with reference to FIG. 3 and FIG. 4.

Figure 3:
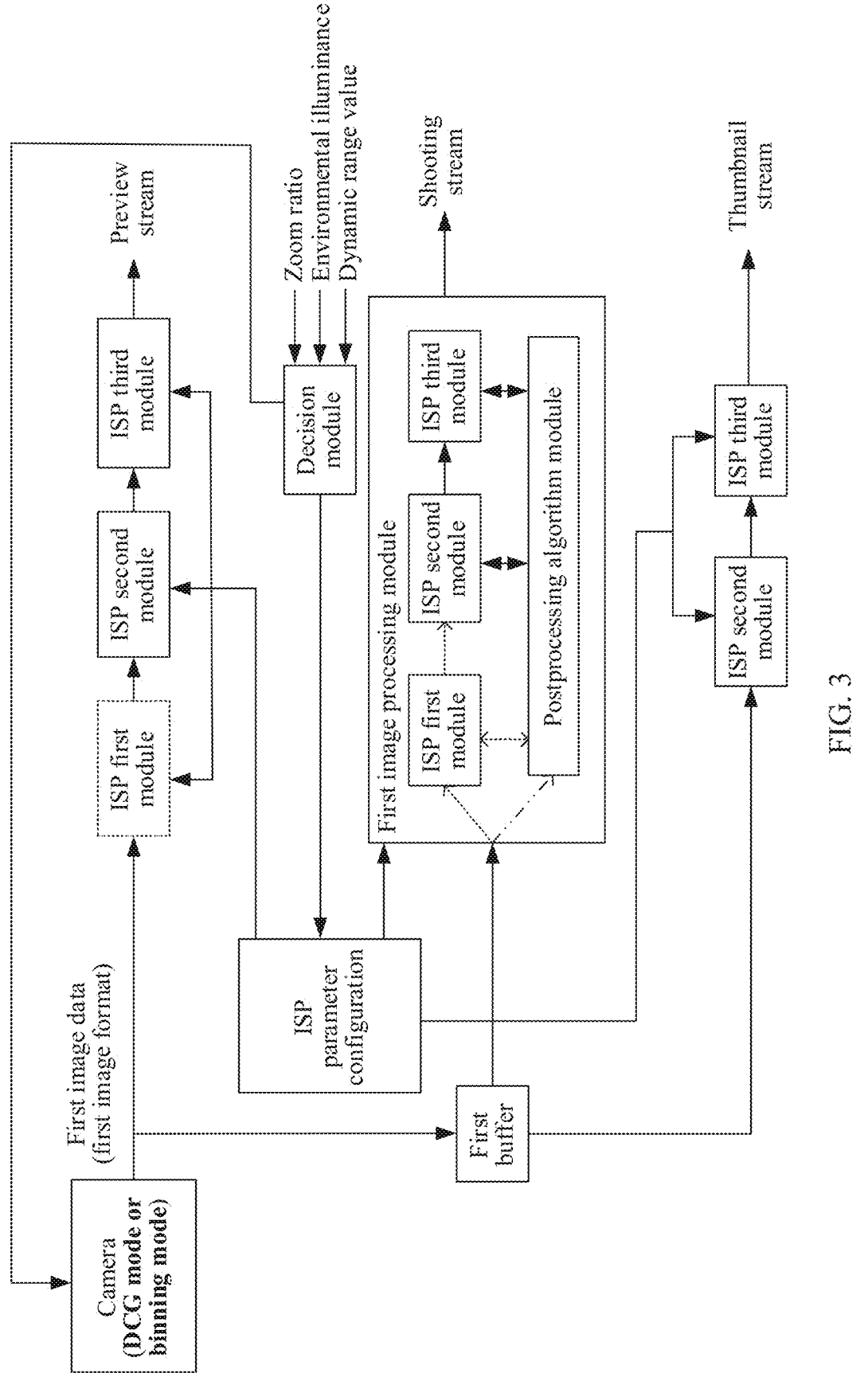
FIG. 3 is a schematic block diagram of a shooting system according to an embodiment of this application.

FIG. 3 is a schematic block diagram of a shooting system 300 according to an embodiment of this application. As shown in FIG. 3, the shooting system 300 includes a decision module, an ISP parameter configuration, a camera, a first buffer, a first image processing module, an ISP first module, an ISP second module, and an ISP third module. The camera includes an optical lens and an image sensor (sensor).

It should be understood that the ISP first module, the ISP second module, and the ISP third module in the preview stream, the ISP first module, the ISP second module, and the ISP third module in the shooting stream, and the ISP first module, the ISP second module, and the ISP third module in the thumbnail stream may be partially reused or completely reused, or may be independent of each other. This is not limited in embodiments of this application.

For example, the preview stream corresponds to one set of the ISP first module, the ISP second module, and the ISP third module; the shooting stream corresponds to one set of the ISP first module, the ISP second module, and the ISP third module; and the thumbnail stream corresponds to one set of the ISP first module, the ISP second module, and the ISP third module. In another example, the preview stream, the shooting stream, and the thumbnail stream share one same set of the ISP first module, the ISP second module, and the ISP third module. In another example, the ISP first module is reused for the preview stream and the shooting stream. The preview stream corresponds to one set of the ISP second module and the ISP third module. The shooting stream corresponds to one set of one set of the ISP second module and the ISP third module. The thumbnail stream corresponds to one set of the ISP second module and the ISP third module.

It may be understood that the foregoing description about the ISP first module, the ISP second module, and the ISP third module is merely an exemplary description, and embodiments of this application are not limited thereto.

It may further be understood that the foregoing description about the ISP first module, the ISP second module, and the ISP third module is also applicable to FIG. 5 and FIG. 7 below, and details are not described below again.

The decision module is configured to determine parameter configurations of the modules (including the camera, the ISP first module, the ISP second module, the ISP third module, and the postprocessing algorithm module) based on a dynamic range value, a zoom ratio, and an environmental illuminance of a shooting scene. The related parameter configurations of the modules may be delivered to the modules by using the ISP parameter configuration module. In other words, the decision module controls and allocates the functions or purposes of the modules by using the ISP parameter configuration module, for example, enables or disables some ISP modules, how the ISP modules process image data, and the like.

In a possible implementation, in a full-illuminance scene (including a high illuminance scene and a low illuminance scene) in which a zoom ratio is equal to a first ratio and a high dynamic range scene, the decision module at least determines the following parameter configurations: The image output manner of the sensor is the DCG mode (corresponding to the first mode).

In a possible implementation, in a full-illuminance scene (including a high illuminance scene and a low illuminance scene) in which a zoom ratio is equal to a first ratio and a low dynamic range scene, the decision module at least determines the following parameter configurations: The image output manner of the sensor is the binning mode (corresponding to the second mode).

An example in which the first ratio is 1× is used for description. There is no loss in a resolution in the 1× scene, so that a resolution requirement of an image can be met. In a 1× high dynamic range scene, the use of the DCG mode by the sensor to perform image output can improve the dynamic range of the scene. In addition, the binning mode can improve a signal-to-noise ratio of an image and improve image effect in a dark light environment. Therefore, in a full scene with a zoom ratio of 1×, in a low dynamic range scene, the binning mode may be used for image output, so that an image has a better signal-to-noise ratio. In a high dynamic range scene, the use of the DCG mode can improve the dynamic effect of the image, to improve image quality.

Optionally, the decision module may further configure other parameters such as the colors, brightness effect, and zoom ratios of the ISP modules, to perform control to implement that the ISP parameter configurations of the ISP modules are consistent.

The camera is configured to acquire an image signal, and the acquired image signal is processed in the binning mode or the DCG mode.

As shown in FIG. 3, the sensor outputs first image data in the DCG mode or the binning mode. A format of the first image data is a first image format (Bayer format).

In FIG. 3, the first buffer is configured to store the first image data outputted by the camera, so that data of a shot frame can be obtained immediately from the first buffer after triggering by a shooting command.

The first image processing module is configured to process image data of a shooting path. The first image processing module includes the postprocessing algorithm module, the ISP first module, the ISP second module, and the ISP third module.

The postprocessing algorithm module is configured to process an image offline in a shooting mode, to improve image effect. For example, the postprocessing algorithm module is configured to perform at least one or more of the following processing on the image: multi-frame fusion noise reduction, multi-frame HRD processing, and the like.

In FIG. 3, for a preview stream, a data stream passes through the ISP first module, the ISP second module, and the ISP third module. The ISP first module does not need to process the data obtained from the sensor. In other words, the data passes through the ISP first module and is transferred to the ISP second module. The ISP second module is configured to perform processing in a bayer domain, to output data in an RGB format. The ISP third module is configured to perform processing in an RGB domain or a YUV domain, to output data in an YUV format.

Further processing functions that can be included in the ISP second module and the ISP third module are described below. It is generally described here that in a case that the ISP second module and the ISP third module are enabled, the processing of the ISP second module and the ISP third module below is also applicable to other modes (the second mode and the third mode below) or a shooting system (for example, a shooting system in FIG. 5 or FIG. 7) or a processing procedure (for example, a processing procedure in FIG. 4, FIG. 6, or FIG. 8) or another path (a shooting stream, or a thumbnail stream). Further processing functions of the ISP second module and the ISP third module are not described again in detail for the ISP second module and the ISP third module that appear below.

Optionally, the ISP second module further includes at least one or more of the following processing: bad pixel correction (BPC), black level correction (BLC), lens shade correction (LSC), automatic white balance (AWB), bayer domain noise reduction (bayer domain NR), Demosaic, and the like.

Optionally, the ISP third module further includes at least one or more of the following processing: color correction (CC), YUV domain noise reduction (YUV domain NR), color enhancement (CE), sharpening, tone mapping, and the like.

As shown in FIG. 3, for a shooting stream, a data stream passes through the first buffer and the first image processing module. A movement direction of a data stream inside the first image processing module may have a plurality of manners. Processing after first data enters the first image processing module is not specifically limited in embodiments of this application. Inside the first image processing module, the decision module may select modules that the data stream is to pass through or modules that the data stream is not to pass through.

FIG. 3 shows two movement directions of a data stream in the first image processing module. In a possible implementation, as shown in FIG. 3, after the first data obtained from the first buffer is delivered into the first image processing module, the first data is first transferred to the postprocessing algorithm module, that is, does not pass through the ISP first module, and then passes through the ISP second module and the ISP third module. The ISP second module and the postprocessing algorithm module are connected by a double-headed arrow (two-way interaction). The ISP third module and the postprocessing algorithm module are connected by a double-headed arrow.

For example, after being processed by the postprocessing algorithm module, data may be delivered into the ISP second module for processing. Next, after the processing by the ISP second module is completed, the data may then be returned to the postprocessing algorithm module for processing, or may be transmitted to the ISP third module for processing. Subsequently, after the processing by the postprocessing algorithm module is completed, the data may be delivered into the ISP third module for processing. Finally, after the processing by the ISP third module is completed, the data is returned to the postprocessing algorithm module for further processing. This helps to improve image quality.

In another possible implementation, as shown in FIG. 3, after being delivered into the first image processing module, the first image data is first transferred to the ISP first module. The ISP first module performs processing (for example, binning, HRD fusion, or the like) on the first image data. Next, the ISP first module sends the processed image data to the postprocessing algorithm module. After the processing by the postprocessing algorithm module is completed, the processed image data may be transmitted to the ISP second module. After the processing by the ISP second module is completed, the image data may then be returned to the postprocessing algorithm module for processing, or may be transmitted to the ISP third module for processing. Subsequently, after the processing by the postprocessing algorithm module is completed, the data may be delivered into the ISP third module for processing. Finally, after the processing by the ISP third module is completed, the data is returned to the postprocessing algorithm module for further processing. This helps to improve image quality.

As shown in FIG. 3, for a thumbnail stream, a data stream passes through the first buffer, the ISP second module, and the ISP third module. The reason that the data stream does not need to pass through the ISP first module lies in that a format of data obtained from the first buffer is data in the first image format, that is, Bayer data. Therefore, Bayer data is obtained without processing by the ISP first module. The thumbnail stream is processed offline. Therefore, the ISP second module and the ISP third module may be invoked to process images. In addition, it should be noted that, for a thumbnail, an image output speed needs to be ensured first, and a definition requirement of an image is lower than that of a shooting stream. Therefore, for a thumbnail stream, an image does not need to be processed by the postprocessing algorithm module.

On the basis of FIG. 3, a corresponding post-path processing procedure is designed in embodiments of this application, and specifically relates to a preview stream, a shooting stream, and a thumbnail stream. A shooting procedure using the shooting system 300 shown in FIG. 3 is described below with reference to FIG. 4.

Figure 4:
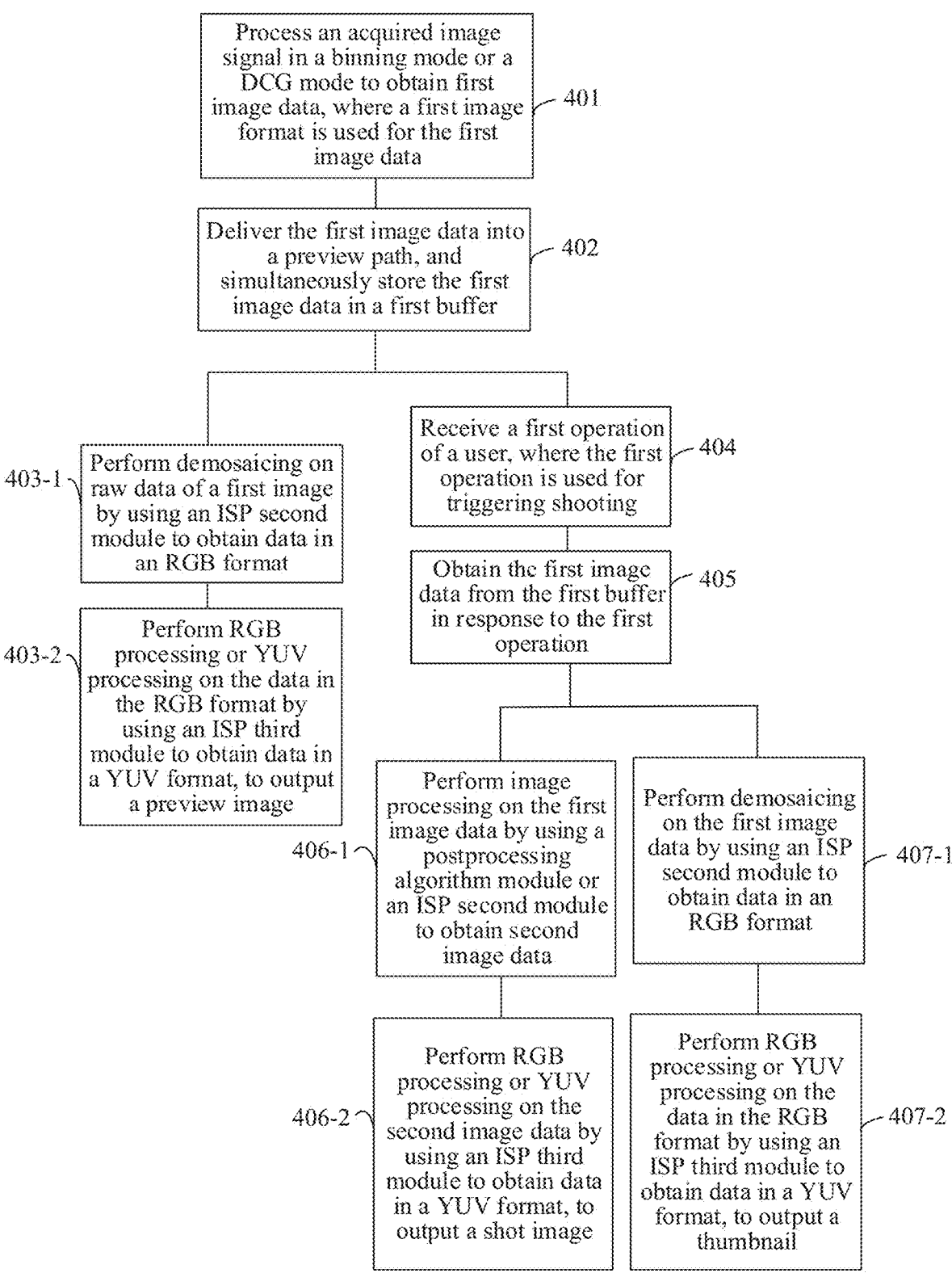
FIG. 4 is a schematic flowchart of a shooting method according to an embodiment of this application.

FIG. 4 is a schematic flowchart of a shooting method when a zoom ratio is equal to a first ratio. As shown in FIG. 4, the shooting method includes the following steps:

Step 401: Process an acquired image signal in a binning mode or a DCG mode to obtain first image data, where a first image format is used for the first image data. The first image format is bayer raw.

In other words, a sensor performs image output in the DCG format or the binning mode, and outputs a bayer raw image, for example, the first image data. The first image data may be delivered into a preview path for processing, or may be stored in a first buffer for invoking by a subsequent shooting path.

Step 402: Deliver the first image data into a preview path, and simultaneously store the first image data in a first buffer.

The first buffer is configured to store data of a shot frame. After triggering by a shooting command, the data of the shot frame obtained from the first buffer may be returned to a user.

A type of the first buffer is not particularly limited in this embodiment of this application. The first buffer may be a conventional buffer or may be a special buffer in a shooting mode. For example, the first buffer is a zero shutter lag (ZSL) buffer. The ZSL buffer is configured to store image data directly outputted by the sensor. In a ZSL mode, after the shooting instruction is delivered, the system selects image data of a corresponding frame from the ZSL buffer and delivers the image data into a shooting stream and a thumbnail stream for processing.

Step 403-1: Perform demosaicing on raw data of a first image by using an ISP second module to obtain data in an RGB format.

Step 403-2: Perform RGB processing or YUV processing on the data in the RGB format by using an ISP third module to obtain data in a YUV format, to output a preview image.

The foregoing step 403-1 and step 403-2 describe a working procedure of the preview path. Through the foregoing procedure, image quality of the preview image can be improved.

Step 404: Receive a first operation of a user, where the first operation is used for triggering shooting.

The first operation is a shooting command. A specific form of the first operation is not specifically limited in embodiments of this application. For example, the first operation is manually tapping a shooting control, or the first operation is controlling a mobile phone through voice to perform shooting, or the first operation is an operation of enabling a shooting function at a scheduled time (for example, automatically performing shooting after three seconds). For example, the first operation is an operation of tapping the shooting control 14 shown in FIG. 1A, FIG. 1B, FIG. 1C, and FIG. 1D by the user.

Step 405: Obtain the first image data from the first buffer in response to the first operation.

After the shooting command is received, an image frame at a corresponding shooting timestamp is retrieved from the first buffer. For example, data of the image frame is the first image data.

Step 406-1: Perform image processing on the first image data by using a postprocessing algorithm module or an ISP second module to obtain second image data.

For example, Bayer domain processing is performed on the first image data by using the postprocessing algorithm module or the ISP second module to obtain data in an RGB format. It may be understood that the postprocessing algorithm module or the ISP second module may perform other image processing. For details, refer to the foregoing description. Details are not described herein again.

Step 406-2: Perform RGB processing or YUV processing on the second image data by using an ISP third module to obtain data in a YUV format, to output a shot image.

The foregoing step 404 to step 406-2 describe a working procedure of the shooting path. Through the foregoing procedure, image quality of the shot image can be improved.

Step 407-1: Perform demosaicing on the first image data by using an ISP second module to obtain data in an RGB format.

Step 407-2: Perform RGB processing or YUV processing on the data in the RGB format by using an ISP third module to obtain data in a YUV format, to output a thumbnail.

The foregoing step 407-1 and step 407-2 describe a working procedure of the thumbnail stream. Through the foregoing procedure, image quality of the thumbnail can be improved.

In the foregoing Case 1, Case 2, Case 3, and Case 4, for the image output manner of the sensor, image output may be performed in the DCG mode or image output may be performed in the binning mode. Modes in which the sensor specifically uses in cases to perform image output have been described in the foregoing case. Details are not described herein again.

In a scene in which the zoom ratio is greater than the first ratio and less than the second ratio and in a low illuminance scene in which the zoom ratio is greater than or equal to the second ratio, after the sensor performs image output in the DCG mode or the binning mode, post-path processing remains the same. The meaning of "remains the same" has also been described above. Details are not described herein again.

Figure 5:
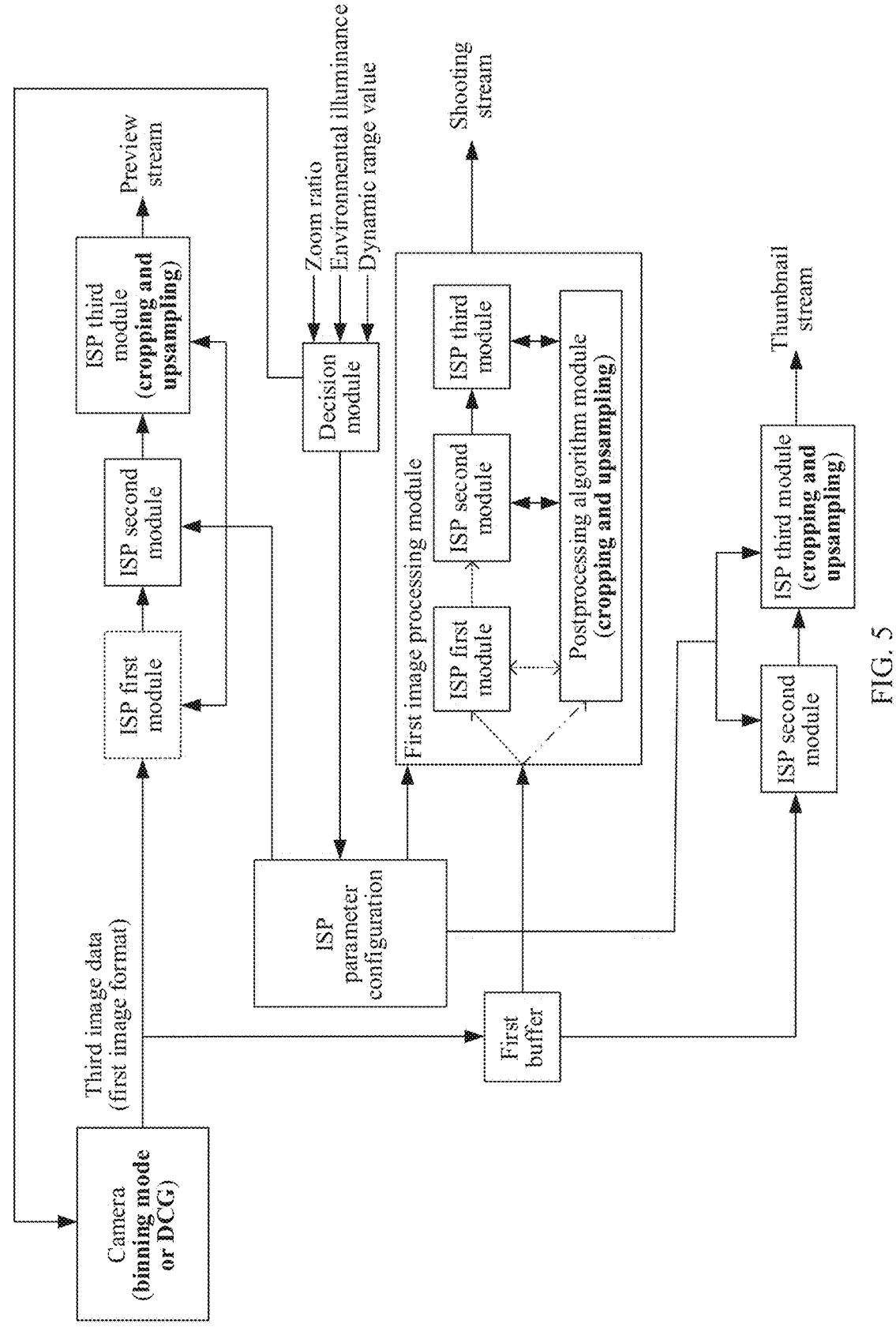
FIG. 5 is a schematic block diagram of another shooting system according to an embodiment of this application.
Figure 6:
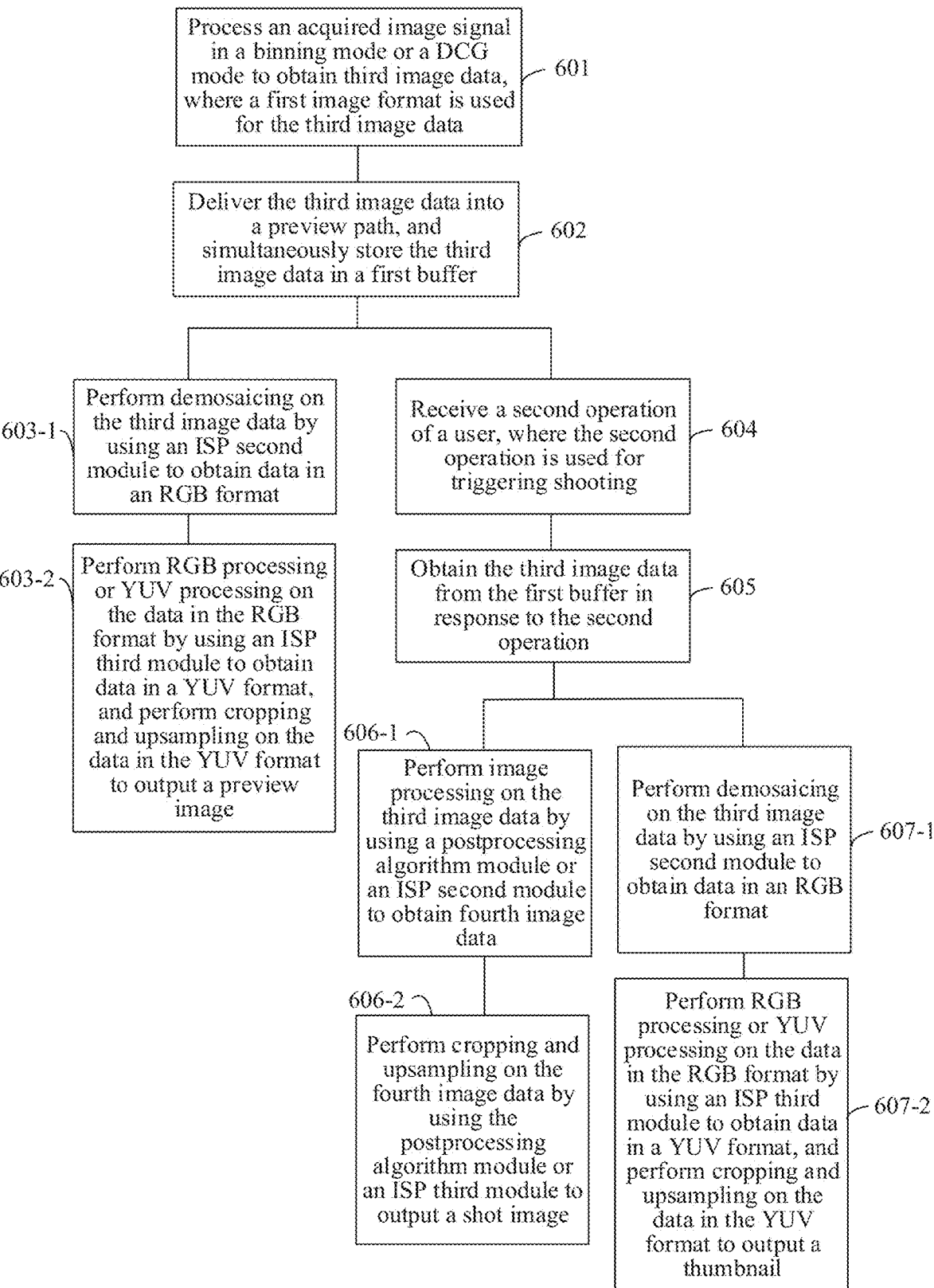
FIG. 6 is a schematic flowchart of another shooting method according to an embodiment of this application.

The following describes another processing procedure of a shooting scene (including a scene in which the zoom ratio is greater than the first ratio and less than the second ratio and a low illuminance scene in which the zoom ratio is greater than or equal to the second ratio) with reference to FIG. 5 and FIG. 6.

FIG. 5 is a schematic block diagram of a shooting system 500 according to an embodiment of this application. The shooting system 500 and the shooting system 300 include the same content. The modules included in the shooting system 500 are not described again herein. A difference between FIG. 5 and FIG. 3 at least lies in the following aspect: In FIG. 5, the ISP third module or the postprocessing algorithm module needs to perform corresponding cropping and upsampling based on a zoom ratio. The reason that the ISP third module or the postprocessing algorithm module needs to perform cropping and upsampling in FIG. 5 lies in that the shooting system shown in FIG. 5 is used for a scene in which the zoom ratio is greater than the first ratio and less than the second ratio, and a low illuminance scene in which the zoom ratio is greater than or equal to the second ratio; and the shooting system shown in FIG. 3 is used for a scene in which the zoom ratio is equal to the first ratio (for example, 1×). The ISP third module or the postprocessing algorithm module in FIG. 3 does not need to perform cropping and upsampling.

In a possible implementation, there are the following two cases: (1) The zoom ratio is greater than or equal to the second ratio, and the scene is a low illuminance and high dynamic scene. (2) The zoom ratio is greater than the first ratio and less than the second ratio, and the scene is a full environmental illuminance (including a high illuminance and a low illuminance) and high dynamic scene. The decision module at least determines the following parameter configurations: An image output manner of the camera is a DCG mode. Image processing of the ISP third module in a preview path includes cropping and upsampling. Image processing of the postprocessing algorithm module or the ISP third module in a shooting path includes cropping and upsampling. Image processing of the ISP third module in a thumbnail path includes cropping and upsampling.

In a possible implementation, there are the following two cases: (1) The zoom ratio is greater than or equal to the second ratio, and the scene is a low illuminance and low dynamic scene. (2) The zoom ratio is greater than the first ratio and less than the second ratio, and the scene is a full environmental illuminance (including a high illuminance and a low illuminance) and low dynamic scene. The decision module at least determines the following parameter configurations: An image output manner of the camera is a binning mode. Image processing of the ISP third module in a preview path includes cropping and upsampling. Image processing of the postprocessing algorithm module or the ISP third module in a shooting path includes cropping and upsampling. Image processing of the ISP third module in a thumbnail path includes cropping and upsampling.

In FIG. 5, the sensor performs image output in the binning mode or the DCG mode to obtain third image data, where a first image format is used for the third image data. After the third image data is obtained, the third image data is delivered into a preview path, and simultaneously the third image data is stored in a first buffer. For the description of the first buffer, refer to the foregoing description (for example, the description about the first buffer under the foregoing step 402). Details are not described herein again.

For example, in a dark light scene with a zoom ratio of 2×, the sensor performs image output in the binning mode in a low dynamic range, so that a signal-to-noise ratio can be improved; and the DCG mode is used in a high dynamic range, so that a dynamic range can be improved. In addition, cropping further needs to be performed based on the zoom ratio of 2×, to obtain a field of view image corresponding to 2×. A preview output image or a shot output image should have the same size of 1×. Therefore, a cropped image further needs to be upsampled.

Similarly, processing procedures of a preview stream, a shooting stream, and a thumbnail stream are included. The description is made with reference to a data movement direction in FIG. 5 as an example.

A data movement direction of a preview stream in FIG. 5 is the same as a data movement direction of the preview stream in FIG. 3. Similarly, in FIG. 5, the ISP first module does not need to process the data obtained from the sensor. In other words, the data passes through the ISP first module and is transferred to the ISP second module; and the ISP third module is configured to perform cropping and upsampling on an image. A field of view image of a corresponding zoom ratio may be obtained through cropping. A preview effect image may be obtained through upsampling.

A data movement direction of a shooting stream in FIG. 5 is the same as a data movement direction of the shooting stream in FIG. 3. The first image processing modules in FIG. 5 and FIG. 3 include the same modules. Similarly, a movement direction of a data stream inside the first image processing module in FIG. 5 may also have a plurality of manners. A difference between the two lies in that in FIG. 5, processing in the postprocessing algorithm module or the ISP third module includes cropping and upsampling, to ensure that a resolution of an image remains unchanged.

As shown in FIG. 5, for a thumbnail stream, a data stream passes through the first buffer, the ISP second module, and the ISP third module. The reason that the data stream does not need to pass through the ISP first module lies in that a format of data obtained from the first buffer is Bayer data. Therefore, Bayer data is obtained without processing by the ISP first module. In addition, the thumbnail stream is processed offline. Therefore, the ISP second module and the ISP third module may be invoked to process images. In addition, the ISP third module is configured to perform cropping and upsampling on an image, to ensure that a resolution of a thumbnail remains unchanged.

On the basis of FIG. 5, a corresponding post-path processing procedure is designed in embodiments of this application, and specifically relates to a preview stream, a shooting stream, and a thumbnail stream. A shooting procedure using the shooting system 500 shown in FIG. 5 is described below with reference to FIG. 6.

FIG. 6 is a schematic flowchart of another shooting method. As shown in FIG. 6, the shooting method includes the following steps:

Step 601: Process an acquired image signal in a binning mode or a DCG mode to obtain third image data, where a first image format is used for the third image data. The first image format is bayer raw.

In other words, a sensor performs image output in the binning mode, and outputs a bayer raw image, for example, the third image data. The third image data may be delivered into a preview path for processing, or may be stored in a first buffer for invoking by a subsequent shooting path.

Step 602: Deliver the third image data into a preview path, and simultaneously store the third image data in a first buffer.

For the description of the first buffer, refer to the foregoing. Details are not described herein again.

Step 603-1: Perform demosaicing on the third image data by using an ISP second module to obtain data in an RGB format.

Step 603-2: Perform RGB processing or YUV processing on the data in the RGB format by using an ISP third module to obtain data in a YUV format, and perform cropping and upsampling on the data in the YUV format to output a preview image.

The foregoing step 603-1 and step 603-2 describe a working procedure of the preview path. Through the foregoing steps, quality of the preview image can be improved.

Step 604: Receive a second operation of a user, where the second operation is used for triggering shooting.

The second operation is a shooting command. For the description of the second operation, refer to the foregoing description of the first operation. Details are not described herein again.

Step 605: Obtain the third image data from the first buffer in response to the second operation.

Step 606-1: Perform image processing on the third image data by using a postprocessing algorithm module or an ISP second module to obtain fourth image data.

For example, Bayer domain processing is performed on the third image data by using the postprocessing algorithm module or the ISP second module to obtain data in an RGB format. It may be understood that the postprocessing algorithm module or the ISP second module may perform other image processing. For details, refer to the foregoing description. Details are not described herein again.

Step 606-2: Perform cropping and upsampling on the fourth image data by using the postprocessing algorithm module or an ISP third module to output a shot image.

The foregoing step 604 to step 606-2 describe a working procedure of a shooting stream in a second mode. Through the foregoing steps, quality of a shot image can be improved.

Step 607-1: Perform demosaicing on the third image data by using an ISP second module to obtain data in an RGB format.

Step 607-2: Perform RGB processing or YUV processing on the data in the RGB format by using an ISP third module to obtain data in a YUV format, and perform cropping and upsampling on the data in the YUV format to output a thumbnail.

The foregoing step 607-1 and step 607-2 describe a working procedure of the thumbnail stream. Through the foregoing steps, quality of a thumbnail can be improved.

In the foregoing Case 5 and Case 6, the image output manner of the sensor is a third mode (that is, a non-binning+cropping mode). A post-path processing procedure is described below with reference to FIG. 7 and FIG. 8.

Figure 7:
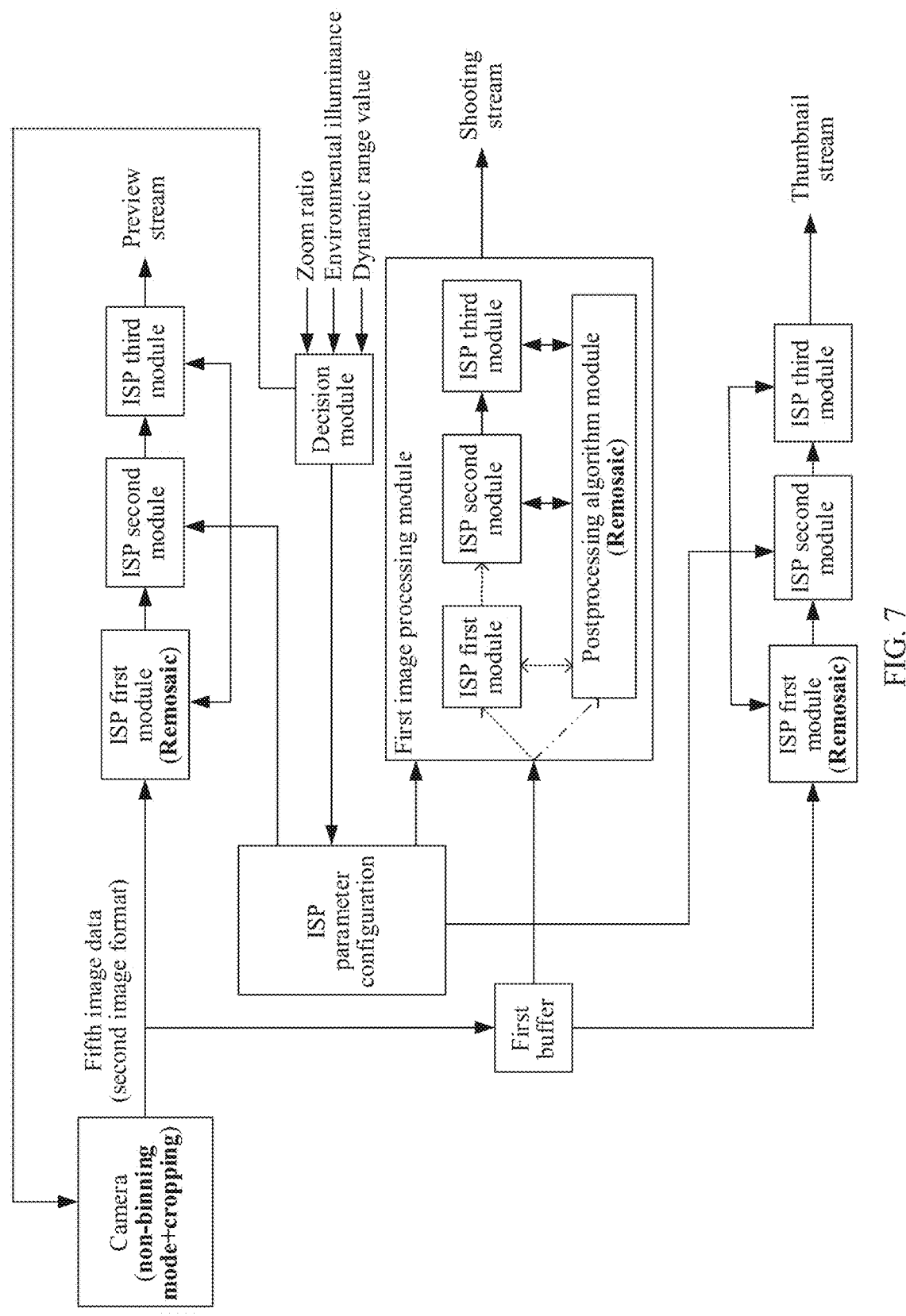
FIG. 7 is a schematic block diagram of still another shooting system according to an embodiment of this application.

FIG. 7 is a schematic block diagram of a shooting system 700 according to an embodiment of this application. The shooting system 700 and the shooting system 300 include the same content. The shooting system 700 and the shooting system 300 include the same content. The modules included in the shooting system 700 are not described again herein. A difference between FIG. 7 and FIG. 3 at least lies in the following aspect: In FIG. 7, the image output manner of the sensor is a non-binning+cropping mode. The ISP first module or the postprocessing algorithm needs to perform remosaicing.

In a possible implementation, when the zoom ratio is greater than or equal to the second ratio and the environmental illuminance is a high illuminance scene, regardless of whether the dynamic range is a high dynamic range or a low dynamic range, the decision module at least determines the following parameter configurations: an image output manner of the camera is non-binning mode+cropping. Image processing of the ISP first module in a preview path includes remosaicing, the ISP first module or the postprocessing algorithm module in a shooting path needs to perform remosaicing, and image processing of the ISP first module in a thumbnail path includes remosaicing.

In FIG. 7, the camera is configured to acquire an image signal, and the acquired image signal is processed in the non-binning+cropping mode, to output fifth image data. A second image format (that is, quadra raw) is used for the fifth image data. In other words, the sensor performs image output in the non-binning+cropping mode.

It should be noted that, the non-binning mode is used as the image output manner of the sensor. Compared with the binning mode, there is no loss of a resolution (or definition) of an image in the non-binning mode. The definition of the image needs to be prioritized at a high zoom ratio (for example, the zoom ratio is greater than or equal to the second ratio). Therefore, it is more appropriate to perform image output in the non-binning mode at the high zoom ratio. In addition, after an image signal is processed in the non-binning mode, it is only necessary to perform cropping to obtain an image of a corresponding field of view of a high zoom ratio, and the image no longer needs to be upsampled.

For example, it is assumed that the resolution of the sensor is 50 M (in other words, 50 mega pixels) and the zoom ratio is 2×. In this case, after the sensor performs image output in the non-binning, cropping of a 2× field of view (FOV) is further required, so that an image of 12.5 M can be obtained.

The first buffer is configured to store the fifth image data outputted by the camera, so that data of a shot frame can be obtained immediately from the first buffer after triggering by a shooting command.

The first image processing module is configured to process image data of a shooting path. The first image processing module includes the postprocessing algorithm module, the ISP first module, the ISP second module, and the ISP third module.

The postprocessing algorithm module is configured to perform remosaicing on an image offline in a shooting mode, to improve image effect.

Optionally, the postprocessing algorithm module may further be configured to perform at least one or more of the following processing on the image: multi-frame fusion noise reduction, multi-frame HRD processing, and the like.

As shown in FIG. 7, for a preview stream, a data stream passes through the ISP first module, the ISP second module, and the ISP third module. The ISP first module is configured to perform remosaicing on the fifth image data. The ISP second module is configured to perform processing in a bayer domain, to output data in an RGB format. The ISP third module is configured to perform processing in an RGB domain or a YUV domain, to output data in an YUV format.

Further processing functions may further be included in the ISP second module or the ISP third module. For a related description, refer to the foregoing. Details are not described below.

Optionally, the ISP first module further includes at least one or more of the following processing: binning, HDR fusion, and the like. It is generally described here that in a case that the ISP first module is enabled, further processing functions included in the ISP first module described herein are also applicable to the ISP first module (for example, the ISP first module in FIG. 3 or FIG. 5) that appears in other places in embodiments of this application.

As shown in FIG. 7, for a shooting stream, a data stream passes through the first buffer and the first image processing module. A movement direction of a data stream inside the first image processing module may have a plurality of manners. Processing after fifth image data enters the first image processing module is not specifically limited in embodiments of this application. The decision module may be located inside the first image processing module, and selects modules that the data stream is to pass through or modules that the data stream is not to pass through.

FIG. 7 shows two movement directions of a data stream in the first image processing module. In a possible implementation, as shown in FIG. 7, after the fifth image data obtained from the first buffer is delivered into the first image processing module, the first data is first transferred to the postprocessing algorithm module, that is, does not pass through the ISP first module, the postprocessing algorithm module performs remosaicing on the fifth image data, and then passes through the ISP second module and the ISP third module. The ISP second module and the postprocessing algorithm module are connected by a double-headed arrow (two-way interaction). The ISP third module and the postprocessing algorithm module are connected by a double-headed arrow.

For example, after the remosaicing by the postprocessing algorithm module, the fifth image data may be delivered into the ISP second module for processing. Next, after the processing by the ISP second module is completed, the image data may then be returned to the postprocessing algorithm module for processing, or may be transmitted to the ISP third module for processing. Subsequently, after the processing by the postprocessing algorithm module is completed, the data may be delivered into the ISP third module for processing. Finally, after the processing by the ISP third module is completed, the data is returned to the postprocessing algorithm module for further processing. This helps to improve image quality.

When the fifth image data (in a quadra raw format) is delivered into the postprocessing algorithm module, a noise model is intact. Therefore, the postprocessing algorithm module may perform noise reduction based on the fifth image data. In this way, better noise reduction effect can be achieved by using a noise modeling method. Compared with the delivery of the fifth image data into an ISP or the camera for remosaicing, this method can achieve better noise reduction effect, which helps to improve definition of a shot image, and improve shooting experience of a user.

In another possible implementation, as shown in FIG. 7, after being delivered into the first image processing module, the fifth image data is first transferred to the ISP first module. The ISP first module performs remosaicing on the fifth image data. Next, the ISP first module sends the processed image data to the postprocessing algorithm module. After the processing by the postprocessing algorithm module is completed, the processed image data may be transmitted to the ISP second module. After the processing by the ISP second module is completed, the image data may then be returned to the postprocessing algorithm module for processing, or may be transmitted to the ISP third module for processing. Subsequently, after the processing by the postprocessing algorithm module is completed, the data may be delivered into the ISP third module for processing. Finally, after the processing by the ISP third module is completed, the data is returned to the postprocessing algorithm module for further processing. This helps to improve image quality.

As shown in FIG. 7, for a thumbnail stream, a data stream passes through the first buffer, the ISP first module, the ISP second module, and the ISP third module. The ISP first module is configured to perform remosaicing on the fifth image data. A format of the obtained image data is bayer raw. Bayer raw obtained after the processing by the ISP first module may be further processed by the ISP second module and the ISP third module. The ISP second module is configured to perform processing in a bayer domain, to output data in an RGB format. The ISP third module is configured to perform processing in an RGB domain or a YUV domain, to output data in an YUV format.

It should be noted that, for a thumbnail, an image output speed needs to be ensured first, and therefore a definition requirement of an image of a thumbnail stream is lower than that of a shooting stream. Therefore, for a thumbnail stream, an image does not need to be processed by the postprocessing algorithm module.

A post-path processing procedure is designed when the sensor performs image output in the third mode in embodiments of this application, and specifically relates to a preview stream, a shooting stream, and a thumbnail stream. A shooting procedure using the shooting system 700 shown in FIG. 7 is described below with reference to FIG. 8.

Figure 8:
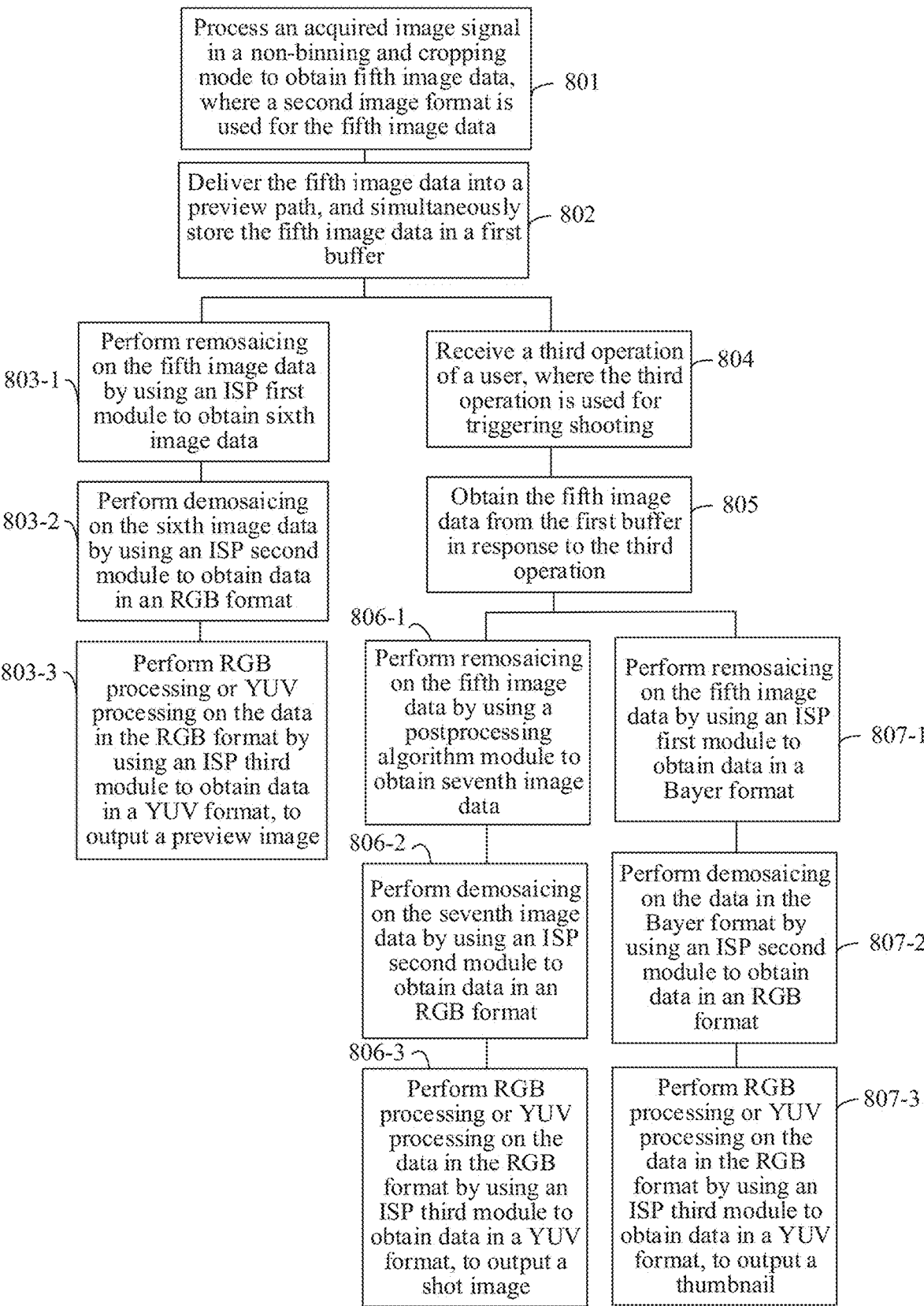
FIG. 8 is a schematic flowchart of still another shooting method according to an embodiment of this application.

FIG. 8 is a schematic flowchart of another shooting method of a shooting scene (that is, the zoom ratio is greater than or equal to the second ratio and the environmental illuminance is a high illuminance scene). As shown in FIG. 8, the shooting method includes the following steps:

Step 801: Process an acquired image signal in a non-binning and cropping mode to obtain fifth image data, where a second image format is used for the fifth image data.

Specifically, the sensor performs image output in the non-binning mode based on an acquired image signal, and performs cropping (for example, which is implemented through a crop function) based on an image in a quadra raw format, to obtain a quadra raw image.

Step 802: Deliver the fifth image data into a preview path, and simultaneously store the fifth image data in a first buffer.

For the description of the first buffer, refer to the foregoing. Details are not described herein again.

Step 803-1: Perform remosaicing on the fifth image data by using an ISP first module to obtain sixth image data, and deliver the sixth image data into the ISP second module. A first image format (bayer raw) is used for the sixth image data.

In other words, a format of an image outputted by the sensor is the quadra raw format, and after the processing by the ISP first module, an image in a bayer raw format is obtained.

Step 803-2: Perform demosaicing on the sixth image data by using an ISP second module to obtain data in an RGB format.

Step 803-3: Perform RGB processing or YUV processing on the data in the RGB format by using an ISP third module to obtain data in a YUV format, to output a preview image.

The foregoing step 803-1 and step 803-3 describe a working procedure of the preview stream.

Step 804: Receive a third operation of a user, where the third operation is used for triggering shooting.

For the third operation, refer to the foregoing description of the first operation. Details are not described herein again.

Step 805: Obtain the fifth image data from the first buffer in response to the third operation.

After the shooting command is received, an image frame at a corresponding shooting timestamp is retrieved from the first buffer. For example, data of the image frame is the fifth image data.

Step 806-1: Perform remosaicing on the fifth image data by using a postprocessing algorithm module to obtain seventh image data. The first image format (bayer raw) is used for the seventh image data.

In addition, it is mentioned above that in a case that the zoom ratio is greater than or equal to the second ratio and the environmental illuminance is a high illuminance scene, when the dynamic range is the high dynamic range, a dynamic range of a shooting scene can be improved by performing a multi-frame postprocessing algorithm on long and short exposure frames. Correspondingly, in step 806-1, optionally, the postprocessing algorithm module is further configured to perform multi-frame fusion on a plurality of image frames outputted by the sensor in the DCG mode, so that a dynamic range of a shooting scene is improved. Alternatively, optionally, the ISP first module may perform multi-frame fusion on the plurality of image frames outputted by the sensor in the DCG mode.

Step 806-2: Perform demosaicing on the seventh image data by using an ISP second module to obtain data in an RGB format.

Step 806-3: Perform RGB processing or YUV processing on the data in the RGB format by using an ISP third module to obtain data in a YUV format, to output a shot image.

The foregoing step 804 to step 806-3 describe a working procedure of the shooting stream. In processing of a shooting path, compared with the delivery of the fifth image data into an ISP or the camera for remosaicing, the case of performing remosaicing on the fifth image data by using the postprocessing algorithm module can achieve better noise reduction effect, which helps to improve definition of a shot image.

In addition, in the shooting path, the remosaicing may be performed by the ISP first module. FIG. 8 only shows a case in which the postprocessing algorithm module performs remosaicing.

Optionally, the foregoing step 806-1 may be replaced with: Perform remosaicing on the fifth image data by using an ISP first module to obtain seventh image data. The first image format (bayer raw) is used for the seventh image data. Correspondingly, corresponding adjustments may be made to step 806-2 and step 806-3. For example, step 806-2 is replaced with: Perform image processing on the seventh image data by using the postprocessing algorithm module, and deliver image data obtained through the processing by the postprocessing algorithm module into the ISP second module for processing. Step 806-3 is replaced with: Process, by using the ISP third module, the image data outputted by the ISP second module to output a shot image. A specific processing manner of image data by the postprocessing algorithm module, the ISP second module, or the ISP third module is not limited. For details, refer to the foregoing description.

Step 807-1: Perform remosaicing on the fifth image data by using an ISP first module to obtain data in a Bayer format.

Step 807-2: Perform demosaicing on the data in the Bayer format by using an ISP second module to obtain data in an RGB format.

Step 807-3: Perform RGB processing or YUV processing on the data in the RGB format by using an ISP third module to obtain data in a YUV format, to output a thumbnail.

The foregoing step 804, step 805, and step 807-1 to step 807-3 describe a working procedure of the thumbnail stream. Through the foregoing steps, quality of a thumbnail can be improved.

It may be understood that the shooting systems shown in FIG. 3, FIG. 5, and FIG. 7 are merely exemplary descriptions, and embodiments of this application are not limited thereto.

It may further be understood that the procedures of the shooting method shown in FIG. 4, FIG. 6, and FIG. 8 are merely exemplary descriptions, and do not constitute a limitation on the protection scope of embodiments of this application.

A software system and hardware architecture to which embodiments of this application are applied are described below with reference to FIG. 9 and FIG. 10.

Figure 9:
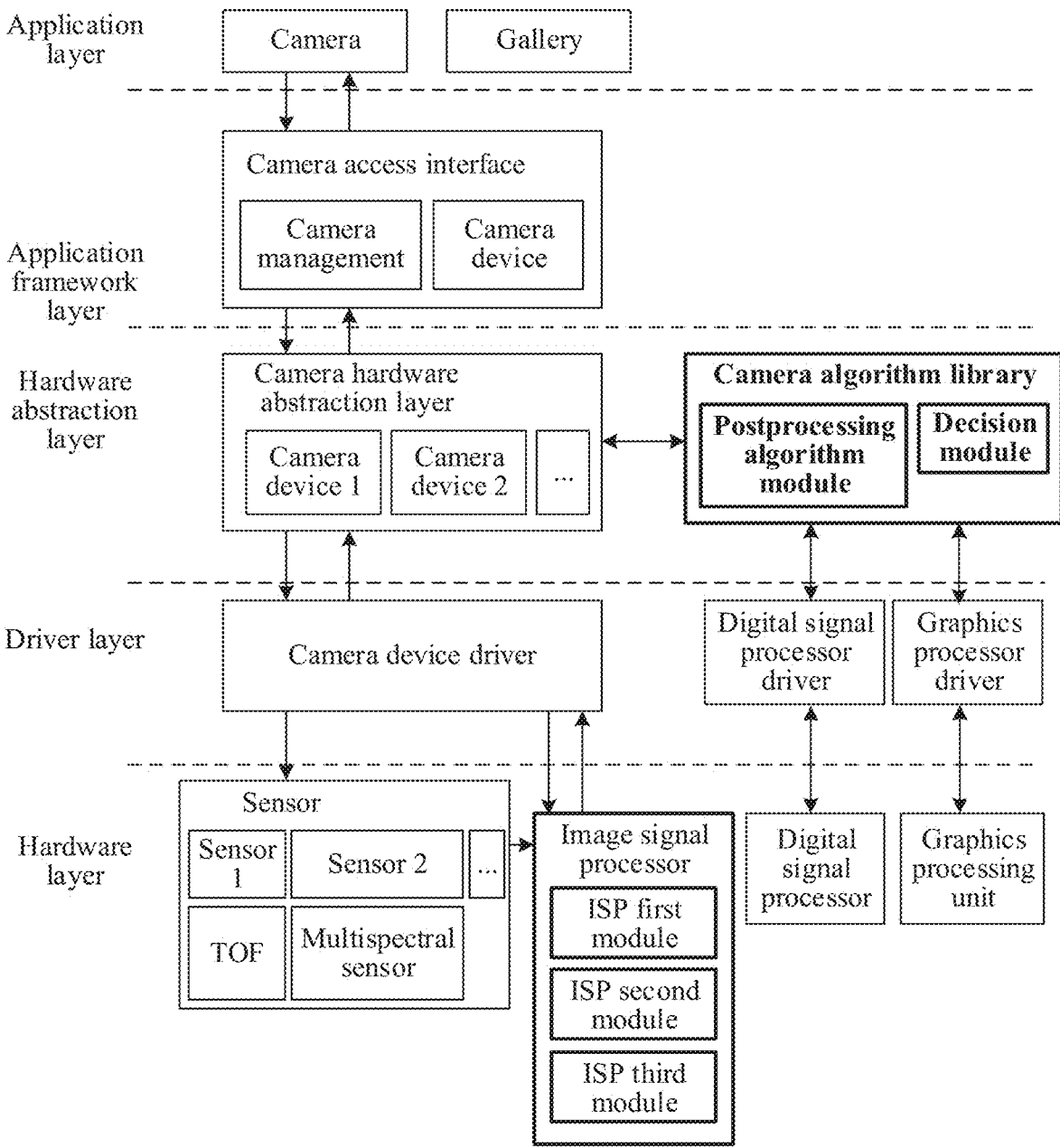
FIG. 9 is a schematic diagram of an architecture to which an embodiment of this application is applied.

FIG. 9 is a schematic diagram of an architecture (including a software system and a hardware system) to which an embodiment of this application is applied. As shown in FIG. 9, the application architecture is divided into several layers, and each layer has a clear role and task. Layers communicate with each other through a software interface. In some embodiments, the application architecture may be divided into five layers: an application layer, an application framework layer, a hardware abstraction layer HAL, a driver layer, and a hardware layer from top to bottom.

As shown in FIG. 9, the application layer includes a camera and a gallery.

It may be understood that, some application programs are shown in FIG. 9, and in fact the application layer may further include other application programs, which is not limited in this application. For example, the application layer further includes application programs such as message, alarm clock, weather, stopwatch, compass, timer, flashlight, calendar, and Alipay.

As shown in FIG. 9, the application framework layer includes a camera access interface. The camera access interface includes camera management and a camera device.

The hardware abstraction layer includes a camera hardware abstraction layer and a camera algorithm library. The camera hardware abstraction layer includes a plurality of camera devices. The camera algorithm library includes a postprocessing algorithm module and a decision module.

It should be understood that the decision module may be placed in another layer. In a possible implementation, the decision module may be placed in the application layer or the application framework layer.

The driver layer is used for driving hardware resources. The driver layer may include a plurality of driver modules. As shown in FIG. 9, for example, the drive layer includes a camera device driver, a digital signal processor driver, a graphics processor driver, and the like.

The hardware layer includes a sensor, an image signal processor, a digital signal processor, and a graphics processing unit. The sensor includes a plurality of sensors, a TOF camera, and a multispectral sensor. The image signal processor includes an ISP first module, an ISP second module, and an ISP third module.

For example, a user map tap on a camera application program. When the user taps on the camera to perform shooting, a shooting instruction may be delivered to the camera hardware abstraction layer through the camera access interface. The camera hardware abstraction layer invokes the camera device driver and invokes the camera algorithm library. The decision module in the camera algorithm library determines a shooting mode (for example, a first mode, a second mode, or a third mode) based on a zoom ratio, an environmental illuminance, and a dynamic range value, and sends configured parameters (including an image output manner of the sensor, parameter configurations of the ISP modules, and a parameter configuration of the postprocessing algorithm module) to the camera hardware abstraction layer. The camera hardware abstraction layer delivers the parameters configured by the decision module to the camera device driver. The camera device driver sends the configuration parameters delivered by the camera hardware abstraction layer to the hardware layer, for example, sends the image output manner of the sensor to the sensor, and sends the parameter configurations of the ISP modules to the image signal processor. The sensor performs image output based on the image output manner of the sensor. The image signal processor performs corresponding processing based on the parameter configurations of the ISP modules. The camera algorithm library is further configured to deliver a digital signal to the digital signal processor driver in the driver layer, for the digital signal processor driver to invoke the digital signal processor in the hardware layer to perform digital signal processing. The digital signal processor may return the processed digital signal to the camera algorithm library through the digital signal processor driver. The camera algorithm library is further configured to deliver a graphic signal to the digital signal processor driver in the driver layer, for the graphic signal processor driver to invoke the graphics processing unit in the hardware layer to perform digital signal processing. The graphics processing unit may return the processed graphic data to the camera algorithm library through the graphics processing unit driver.

In addition, an image outputted by the image signal processor may be sent to the camera device driver. The camera device driver may send the image outputted by the image signal processor to the camera hardware abstraction layer. The camera hardware abstraction layer may send the image into the postprocessing algorithm module for further processing or may send the image into the camera access interface. The camera access interface may send the image returned by the camera hardware abstraction layer to a camera.

The software system to which an embodiment of this application is applied is described above in detail. The following describes a hardware system of an electronic device 1000 with reference to FIG. 10.

Figure 10:
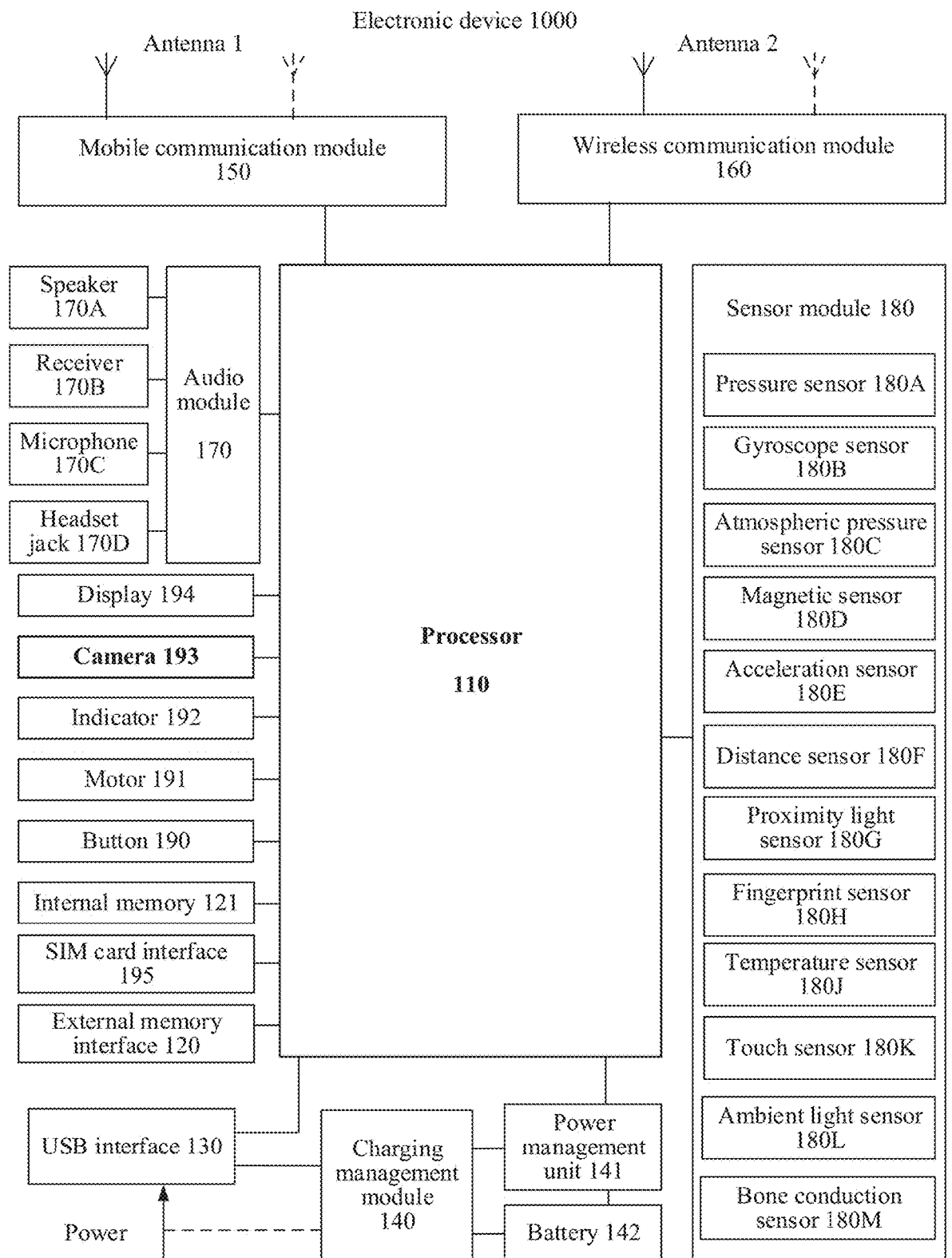
FIG. 10 is a schematic diagram of a structure of an electronic device to which this application is applicable.

FIG. 10 is a schematic diagram of a structure of an electronic device 1000 applicable to this application.

The electronic device 1000 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headphone jack 170D, a sensor module 180, a button 190, a motor 191, an indicator 192, a camera 193, a display screen 194, a subscriber identification module (SIM) card interface 195, and the like. The sensor module 180 may include a pressure sensor 180A, a gyroscope sensor 180B, an atmospheric pressure sensor 180C, a magnetic sensor 180D, an acceleration sensor 180E, a distance sensor 180F, a proximity light sensor 180G, a fingerprint sensor 180H, a temperature sensor 180J, a touch sensor 180K, an ambient light sensor 180L, a bone conduction sensor 180M, and the like.

Notably, the structure shown in FIG. 10 does not impose a specific limitation to the electronic device 1000. In some other embodiments of this application, the electronic device 1000 may include more or fewer components than those shown in FIG. 10, the electronic device 1000 may include a combination of some of the components shown in FIG. 10, or the electronic device 1000 may include sub-components of some of the components shown in FIG. 10. For example, the proximity optical sensor 180G shown in FIG. 10 may be optional. The components shown in FIG. 10 may be implemented in hardware, software, or a combination of software and hardware.

The processor 110 may include one or more processing unit. For example, the processor 110 may include at least one of the following processing units: an application processor (AP), a modem processor, a graphics processing unit (GPU), an image signal processor (ISP), a controller, a memory, a video codec, a digital signal processor (DSP), a baseband processor, and a neural-network processing unit (NPU). Different processing units can be independent devices or an integrated device.

The controller may generate an operation control signal based on instruction operation code and a timing signal, to control instruction fetching and instruction execution.

The processor 110 may further be configured with a memory configured to store an instruction and data. In some embodiments, the memory of the processor 110 is a cache. The memory may store instructions or data that is recently used or cyclically used by the processor 110. If the processor 110 needs to use the instructions or the data again, the processor can directly invoke them from the memory. Repeated access is avoided, and waiting time of the processor 110 is reduced, thereby improving efficiency of the system.

In some embodiments, the processor 110 may include one or more interfaces. For example, the processor 110 may include at least one of the following interfaces: an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, and a USB interface.

A connection relationship between the modules shown in FIG. 10 is an example for description and does not constitute a limitation on the connection relationship between the modules of the electronic device 1000. Optionally, a combination of a plurality of connection manners in the foregoing embodiment may alternatively be used for the modules of the electronic device 1000.

The charging management module 140 is configured to receive electric power from the charger. The charger may be a wireless charger, or may be a wired charger. In some wired charging embodiments, the charge management module 140 may receive current from the wired charger through the USB interface 130. In some embodiments of wireless charging, the charge management module 140 may receive electromagnetic waves (a current path is shown by a dashed line) through a wireless charging coil of the electronic device 1000. The charging management module 140 may supply power to the electronic device 1000 by using the power management unit 141 while charging the battery 142.

The power management module 141 is connected to the battery 142, the charging management module 140, and the processor 110. The power supply management module 141 receives an input from the battery 142 and/or the charging management module 140 and supplies power to the processor 110, the internal memory 121, the display screen 194, the camera 193, the wireless communication module 160, and the like. The charge management module 141 may further be configured to monitor parameters such as battery capacity, battery cycle count, and state of health (for example, leakage and impedance). Optionally, the power management module 141 may be provided in the processor 110, or the power management module 141 and the charge management module 140 may be provided in one device.

A wireless communication function of the electronic device 1000 may be implemented by using components such as the antenna 1, the antenna 2, the mobile communication module 150, the wireless communication module 160, the modem processor, and the baseband processor.

The electronic device 1000 can implement a display function through the GPU, the display screen 194 and the application processor. The GPU is a microprocessor for image processing and connects the display screen 194 to the application processor. The GPU is configured to perform mathematical and geometric calculation for graphics rendering. The processor 110 may include one or more GPUs, and the GPU executes program instructions to generate or change display information.

The display screen 194 may be configured to display images or videos. The display screen 194 includes a display panel. The display panel may be a liquid crystal display (LCD), an organic light-emitting diode (OLED), an active-matrix organic light-emitting diode (AMOLED), a flex light-emitting diode (FLED), a mini light-emitting diode (Mini LED), a micro light-emitting diode (Micro LED), a micro OLED, or a quantum dot light emitting diode (QLED). In some embodiments, the electronic device 1000 may include 1 or N display screens 194, where N is a positive integer greater than 1.

The electronic device 1000 may implement a shooting function by using the ISP, the camera 193, the video codec, the GPU, the display screen 194, the application processor, and the like.

The ISP is configured to handle data returned by the camera 193. For example, during photographing, a shutter is open, and light is transmitted to a photosensitive element of the camera through a lens. An optical signal is converted into an electrical signal. The photosensitive element of the camera transfers the electrical signal to the ISP for processing, so that the ISP converts the electrical signal into an image visible to naked eyes. The ISP may perform algorithm optimization on noise, lightness, and color of the image, and the ISP may further optimize parameters such as exposure and color temperature of a shooting scene. In some embodiments, the ISP may be disposed in the camera lens 193.

The camera 193 is configured to capture a still image or a video. An object generates an optical image by using a lens and projects the optical image to a photosensitive element. The photosensitive element may be a charge-coupled device (CCD) or a complementary metal-oxide-semiconductor (CMOS) phototransistor. The photosensitive element converts the optical signal into the electrical signal and then transmits the electrical signal to the ISP to convert the electrical signal into a digital image signal. The ISP outputs the digital image signal to a DSP for processing. The DSP converts the digital image signal into a standard image signal in a format such as red green blue (RGB) or YUV. In some embodiments, the electronic device 1000 may include one or N camera lenses 193, where N is a positive integer greater than 1.

The digital signal processor is configured to process a digital signal and may process another digital signal in addition to the digital image signal. For example, when the electronic device 1000 performs frequency selection, the digital signal processor is configured to perform Fourier transform, and the like on frequency energy.

The video encoder and decoder is configured to compress or decompress a digital video. The electronic device 1000 may support one or more video encoders and decoders. In this way, the electronic device 1000 may play or record videos in a plurality of coding formats, for example, moving picture experts group (MPEG) 1, MPEG 2, MPEG 3, and MPEG 4.

The NPU is a processor that learns from the structure of biological neural networks. For example, the NPU learns from the transmission mode between neurons in the human brain to quickly process input information, and is also capable of continuous self-learning. Functions such as intelligent cognition of the electronic device 1000 may be implemented by the NPU, for example, image recognition, face recognition, speech recognition, and text understanding.

The electronic device 1000 may implement audio functions, such as music playback and recording, by using the audio module 170, the speaker 170A, the receiver 170B, the microphone 170C, the headset jack 170D, and the application processor.

The range sensor 180F is configured to measure a distance. The electronic device 1000 may measure a distance in an infrared or laser manner. In some embodiments, for example, in a shooting scene, the electronic device 1000 may measure a distance by using the distance sensor 180F, to implement quick focusing.

The ambient optical sensor 180L is configured to sense ambient light luminance. The electronic device 1000 may adaptively adjust brightness of the display screen 194 based on the sensed the ambient light brightness. The ambient light sensor 180L may also be configured to automatically adjust the white balance in shooting. The ambient light sensor 180L may further cooperate with an optical proximity sensor 180G to detect whether the electronic device 1000 is in a pocket to prevent accidental touch.

A fingerprint sensor 180H is configured to collect a fingerprint. The electronic device 1000 may implement functions, such as unlocking, application lock accessing, photographing, and call answering, by using a feature of the obtained fingerprint.

The touch sensor 180K may also be referred to as a touch device. The touch sensor 180K may be disposed on the display 194. The touch sensor 180K and the display 194 form a touchscreen, and the touchscreen is also referred to as a touch control screen. The touch sensor 180K is configured to detect a touch operation on or near the touch sensor 180K. The touch sensor 180K may transmit the detected touch operation to the application processor, to determine a type of the touch event. The touch sensor 180K may provide a visual output related to the touch operation by using the display 194. In some other embodiments, the touch sensor 180K may be alternatively arranged on a surface of the electronic device 1000, and is located at a position different from that of the display screen 194.

The button 190 includes a power on/off button and a volume button. The key 190 may be a mechanical key, or may be a touch-sensitive key. The electronic device 1000 may receive a key input signal, to implement a function related to the key input signal.

In some embodiments, the processor 110 may turn on the camera; obtain a zoom ratio and an environmental illuminance value in a current shooting environment; and determine a corresponding shooting procedure based on the zoom ratio and the environmental illuminance value.

In a possible implementation, the processor 110 may select appropriate image output manners for the sensor based on different dynamic ranges, different zoom ratios, and different environmental illuminances.

It may be understood that the image processing method in embodiments of this application is applicable to the electronic device shown in FIG. 10. For specific implementation steps, refer to the introduction of the foregoing method embodiments. Details are not described herein again.

As can be seen from above, embodiments of this application provide an image processing method and an electronic device. An image output manner of a camera is determined based on a zoom ratio and a dynamic range of a shooting scene. A sensor performs image output in a DCG mode when the zoom ratio is greater than or equal to a first ratio and less than a second ratio and the dynamic range is a high dynamic range, which can improve image quality in a high dynamic shooting scene, and can avoid a ghosting problem, so that shooting experience of a user is improved. Further, an environmental illuminance of a shooting scene may be further considered in determining the image output manner of the camera, to select an appropriate image output manner.

This application further provides a computer program product. When the computer program product is executed by the processor, the method according to any method embodiment in this application is implemented.

The computer program product may be stored in a memory, and the computer program product is finally converted into an executable target file that can be executed by the processor through a processing process such as preprocessing, compiling, assembling, and linking.

This application further provides a computer-readable storage medium. The computer-readable storage medium stores a computer program. When the computer program is executed by a computer, the method according to any method embodiment of this application is implemented. The computer program may be a program in a high-level programming language, or may be an executable target program.

The computer-readable storage medium may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM) or a flash memory. The volatile memory may be a random access memory (RAM), which serves as an external cache. By way of example rather than limitation, many forms of RAMs are available, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

A person skilled in the art can clearly understand that, for convenience and conciseness of description, for the specific working processes and technical effects of the apparatuses and devices described above, refer to the corresponding processes and technical effects in the method embodiments. Details are not described herein again.

In the several embodiments provided in this application, the disclosed systems, apparatuses and methods can be implemented in other manners. For example, some characteristics of the method embodiments described above may be omitted or not implemented. The apparatus embodiments described above are only schematic, and division into units is only a logical function division. In actual implementation, there may be another division manner, and multiple units or components may be combined or integrated into another system. In addition, the coupling between units or components may be direct coupling or indirect coupling, including electrical, mechanical or other forms of connection.

It should be understood that, in the embodiments of this application, sequence numbers of the processes do not mean execution sequences. The execution sequences of the processes should be determined according to functions and internal logic of the processes, and should not be construed as any limitation on the implementation processes of the embodiments of this application.

In addition, the terms "system" and "network" in this specification may be used interchangeably in this specification. In this specification, the term "and/or" is only a description of an association relationship between associated objects, and means that there may be three types of relationships. For example, A and/or B may mean that A exists alone, both A and B exist, and B exists alone. In addition, the character "/" in this specification usually indicates that associated objects are in an "or" relationship.

In conclusion, the foregoing embodiments are merely preferred embodiments of the technical solutions of this application, and are not used to limit the protection scope of this application. Any modification, equivalent substitution, improvement, and the like made within the spirit and the principle of this application shall be included in the protection scope of this application.

The invention claimed is:

1. An image processing method, wherein the method is applied to an electronic device, the electronic device comprises an image sensor, and the method comprises:
turning on the image sensor, wherein the image sensor is used for outputting image data;
obtaining a first parameter and a second parameter, wherein the first parameter is used for representing a dynamic range of an image, and the second parameter is used for representing a zoom ratio;
switching an outputting mode of the image sensor from a second mode to a first mode when the first parameter increases from a first value to a second value, wherein the second parameter is less than a third value; and
switching the outputting mode of the image sensor from the first mode to a third mode when the second parameter increases from a fourth value to a fifth value, wherein the first mode is a dual conversion gain mode, the fourth value is less than the third value, the fifth value is greater than or equal to the third value, and the first mode, the second mode, and the third mode are different from each other.

2. The method according to claim 1, further comprising:
obtaining a third parameter, wherein the third parameter is used for representing an environmental illuminance; and
switching the outputting mode of the image sensor from the third mode to the second mode when the third parameter increases from a sixth value to a seventh value, wherein the second parameter is greater than or equal to the third value.

3. The method according to claim 2,
wherein the outputting mode of the image sensor is the second mode when the first parameter increases from an eighth value to the first value; and
wherein the outputting mode of the image sensor is the first mode when the first parameter increases from the second value to a ninth value.

4. The method according to claim 3,
wherein the outputting mode of the image sensor is the third mode when the third parameter increases from a tenth value to the sixth value; and
wherein the mode of outputting image data by the image sensor is the second mode when the third parameter increases from an eleventh value to the seventh value.

5. The method according to claim 2, further comprising:
switching the outputting mode of the image sensor from the second mode to the first mode based on the first value not meeting a first condition and the second value meeting the first condition when the first parameter increases from the first value to the second value; and
switching the outputting mode of the image sensor from the first mode to the third mode based on the fourth value being less than the third value and the fifth value being greater than or equal to the third value when the second parameter increases from the fourth value to the fifth value; and
switching the outputting mode of the image sensor from the third mode to the second mode based on the sixth value being less than a second threshold and the seventh value being greater than the second threshold when the third parameter increases from the sixth value to the seventh value.

6. The method according to claim 5, wherein the second value meets the first condition when the second value is within a first range or the second value is greater than a first threshold.

7. The method according to claim 1, wherein the third value is 2, the fourth value is 1, and the fifth value is 2.

8. The method according to claim 2, wherein the second parameter is 1 when the first parameter increases from the first value to the second value; and wherein the second parameter is 2 when the third parameter increases from the sixth value to the seventh value.

9. The method according to claim 1, wherein the first mode comprises a high gain conversion path and a low gain conversion path; and wherein the high gain conversion path outputs a long exposure frame, and the low gain conversion path outputs a short exposure frame.

10. The method according to claim 1, wherein the third parameter is an illuminance index value (luxindex), and a larger value of the luxindex represents that the environmental illuminance is lower.

11. The method according to claim 1, wherein image data outputted by the image sensor in the first mode is an image frame obtained by fusing two frames.

12. The method according to claim 1, wherein the second mode is a binning mode.

13. The method according to claim 1, wherein image data outputted by the image sensor in the second mode comprises image data read in a mode of one pixel after charges sensed by adjacent pixels are added together.

14. The method according to claim 1, wherein a size of image data outputted by the image sensor in the third mode is less than a resolution of the image sensor.

15. An electronic device, comprising:

an image sensor;

a memory storing a computer program; and a processor is coupled to the memory, wherein when the computer program is executed by the processor, the electronic device is enabled to perform operations comprising:

turning on the image sensor;

obtaining a first parameter and a second parameter, wherein the first parameter is used for representing a dynamic range of an image, and the second parameter is used for representing a zoom ratio;

when the second parameter is 1, outputting image data in a first mode when the first parameter meets a first condition, wherein the first mode is a dual conversion gain mode; and when the second parameter is 1, outputting image data in a second mode when the first parameter does not meet the first condition, wherein the second mode is different from the first mode.

16. The electronic device according to claim 15, wherein the first parameter meeting the first condition comprises the first parameter being within a first range or the first parameter being greater than a first threshold.

17. The electronic device according to claim 15, wherein when the computer program is executed by the processor, the electronic device is further enabled to perform operations comprising:

obtaining a third parameter, wherein the third parameter is used for representing an environmental illuminance;

when the second parameter is 2, outputting image data in a third mode when the third parameter is less than a second threshold, wherein the third mode is different from the first mode; and when the second parameter is 2, outputting image data in the second mode when the third parameter is greater than the second threshold.

18. The electronic device according to claim 17, wherein when the computer program is executed by the processor, the electronic device is further enabled to perform operations comprising:

when the second parameter is 2, outputting image data in the first mode when the third parameter is greater than the second threshold and the first parameter is greater than a third threshold.

19. An electronic device, comprising an image sensor, a processor, and a memory, wherein the processor is coupled to the memory, the memory is configured to store a computer program, and when the computer program is executed by the processor, the electronic device is enabled to perform the method according to claim 1.

20. A chip system, comprising a processor, wherein when the processor executes instructions, the processor is enabled to perform operations comprising:

turning on an image sensor, wherein the image sensor is used for outputting image data;

obtaining a first parameter and a second parameter, wherein the first parameter is used for representing a dynamic range of an image, and the second parameter is used for representing a zoom ratio;

switching an outputting mode of the image sensor from a second mode to a first mode when the first parameter increases from a first value to a second value, wherein the second parameter is less than a third value; and switching the outputting mode of the image sensor from the first mode to a third mode when the second parameter increases from a fourth value to a fifth value, wherein the first mode is a dual conversion gain mode, the fourth value is less than the third value, the fifth value is greater than or equal to the third value, and the first mode, the second mode, and the third mode are different from each other.

* * * * *